US012486374B2

(12) United States Patent
Singer et al.

(10) Patent No.: US 12,486,374 B2
(45) Date of Patent: Dec. 2, 2025

(54) POROUS EPOXY NANOCOMPOSITE MONOLITHS

(71) Applicant: Rutgers, the State University of New Jersey, New Brunswick, NJ (US)

(72) Inventors: Jonathan P. Singer, Cranford, NJ (US); Molla Hasan, Piscataway, NJ (US)

(73) Assignee: Rutgers, the State University of New Jersey, New Brunswick, NJ (US)

( * ) Notice: Subject to any disclaimer, the term of this patent is extended or adjusted under 35 U.S.C. 154(b) by 1023 days.

(21) Appl. No.: 17/598,649

(22) PCT Filed: Mar. 26, 2020

(86) PCT No.: PCT/US2020/024963
§ 371 (c)(1),
(2) Date: Sep. 27, 2021

(87) PCT Pub. No.: WO2020/198474
PCT Pub. Date: Oct. 1, 2020

(65) Prior Publication Data
US 2022/0162414 A1 May 26, 2022

Related U.S. Application Data

(60) Provisional application No. 62/823,921, filed on Mar. 26, 2019.

(51) Int. Cl.
*C08J 9/00* (2006.01)
*C08J 9/28* (2006.01)

(52) U.S. Cl.
CPC ............. *C08J 9/0061* (2013.01); *C08J 9/008* (2013.01); *C08J 9/283* (2013.01); *C08J 2201/026* (2013.01); *C08J 2363/00* (2013.01)

(58) Field of Classification Search
CPC . C08J 9/0061; C08J 9/008; C08J 9/283; C08J 2201/026; C08J 2363/00;
(Continued)

(56) References Cited

U.S. PATENT DOCUMENTS 6,596,405 B2 7/2003 Zampini et al.
8,007,823 B2 8/2011 Favis et al.
(Continued)

OTHER PUBLICATIONS

International Search Report and Written Opinion for corresponding PCT/US2020/024963, issued Jun. 16, 2020.

*Primary Examiner* — K. Boyle
(74) *Attorney, Agent, or Firm* — Wolter Van Dyke Davis, PLLC; Eugene J. Molinelli; Cian G. O'Brien

(57) ABSTRACT

Method of preparing a porous material includes preparing a mixture of from about 10 to about 30% by mass of a matrix material, from about 20 to about 60% by mass of a plurality of particles, from about 20 to about 60% by mass of a porogen, and from about 1 to about 10% by mass of an interfacial compatibilizer. The matrix material and the porogen may be selected so as to be phase separated in the mixture. The method may further include placing the mixture into a form; initiating a solidification of the matrix material during which the porogen remains nonvolatile and the matrix material and the porogen remain phase separated; and removing at least a portion of the porogen to obtain the porous material. Porous materials produced by the methods. Microfluidic channels produced by the methods.

17 Claims, 15 Drawing Sheets

(58) Field of Classification Search
CPC ........ C08J 2405/08; C08J 9/0066; C08J 9/40;
C08J 2201/0502; C08J 2201/052; C08J
2201/0543; C08J 2361/08
See application file for complete search history.

(56) References Cited

U.S. PATENT DOCUMENTS

| | | |
|---|---|---|
| 8,186,519 B2 | 5/2012 | Tsujioka et al. |
| 2003/0004218 A1 | 1/2003 | Allen et al. |
| 2015/0000679 A1 | 1/2015 | Cuypers et al. |
| 2017/0321042 A1 | 11/2017 | Broyles et al. |
| 2018/0043656 A1 | 2/2018 | Song et al. |
| 2018/0312657 A1 | 11/2018 | Yue et al. |

POROUS EPOXY NANOCOMPOSITE MONOLITHS

CROSS-REFERENCE TO RELATED APPLICATIONS

This application is a national stage entry of and claims priority to PCT/US2020/024963, titled Porous Epoxy Nanocomposite Monoliths, filed Mar. 26, 2020, which claims the benefit of U.S. Provisional Patent Application No. 62/823,921, filed Mar. 26, 2019, titled POROUS EPOXY NANOCOMPOSITE MONOLITHS, which is incorporated by reference herein in its entirety.

STATEMENT OF GOVERNMENTAL INTEREST

This invention was made with government support under grant no. 13-C-0516 awarded by National Reconnaissance Office. The government has certain rights in the invention.

FIELD OF THE INVENTION

Various embodiments of the present invention relate generally to porous nanocomposites and more specifically to porous epoxy nanocomposite monoliths.

BACKGROUND

Porous materials are crucial for numerous applications, including energy conversion and storage, catalysis, tissue engineering, drug delivery, cell-makers, smart filtering, and photonics. Porous monoliths have proven useful as an alternative stationary phase material for diverse applications including liquid chromatography. A porous monolith can be defined as an object having a continuous solid phase that defines a plurality of internal channels extending through. A plethora of methods have been developed to fabricate porous monoliths. However, these methods require high temperature treatments or incur significant materials shrinkage. For many applications, requiring specifically sized pores and/or channels, unpredictable shrinkage is a major problem. A need exists for a means of creating porous materials that can be processed in ambient conditions, with reduced volume change or shrinkage. A need also exists for a way of producing such porous materials that may be molded into forms that are ideal for a desired application.

Current technologies for producing porous polymers include controlled phase separation of a crosslinking polymer or oligomer and a sacrificial porous phase, silica sol gel reactions in place of a polymeric system, and particle sintering. All of these methods have serious limitations and drawbacks. Controlled phase separation of a crosslinking polymer or oligomer and a sacrificial porous phase can be used to make a porous polymer, but the crosslinking network excludes the porogen during crosslinking, which can occur with nanoscopic range. One problem is that the overall pore structure is highly linked to the shrinkage that occurs during polymerization. Another issue is that the final structures all have the surface chemistry of the photoresist unless further post-treatment is applied. One solution to both problems is to create the structures ex situ, but this is laborious.

The problem of chemistry has been mitigated to a great extent by using silica sol gel reactions in place of polymeric systems, but sol gel reactions have an even greater tendency to shrink than polymer crosslinking, such that large gaps can be left around the edges of the channels if done in situ. Finally, a majority of conventional porous materials are made by particle sintering, but this requires high temperature and often high-pressure treatments.

BRIEF SUMMARY

Various embodiments relate to a method of preparing a porous material. The method may comprise preparing a mixture. The mixture may comprise from about 10 to about 30% by mass of a matrix material, from about 20 to about 60% by mass of a plurality of particles, from about 20 to about 60% by mass of a porogen, and from about 1 to about 10% by mass of an interfacial compatibilizer. The matrix material and the porogen may be selected so as to be phase separated in the mixture. According to various embodiments, the mixture may be a bicontinuous emulsion. According to various embodiments, preparing the mixture may be done at room temperature.

The method may further comprise placing the mixture into a form. As will be described in greater detail hereinafter, the form may be a temporary mold that will later be removed or may be a structure into which the final porous material is intended to remain. Therefore, according to various embodiments, the method may or may not further comprise removing the porous material from the form to produce at least one porous monolith. According to various embodiments, the form may be a mold. According to various embodiments, the form may be at least a portion of a microfluidic channel, such as may be employed in a microfluidic device or a microfluidic chip.

The method may further comprise initiating a solidification of the matrix material during which the porogen remains nonvolatile and the matrix material and the porogen remain phase separated. Initiating the solidification of the matrix material may be done before, after, or as the mixture is placed into the form. According to various embodiments, initiating the solidification may comprise initiating a crosslinking reaction of the matrix material by adding a crosslinker to the mixture. The crosslinker may bond to the matrix material and thereby be incorporated into the porous material. According to various embodiments, the crosslinker may be selected from the group consisting of amine crosslinker, peroxide crosslinker, photo crosslinker, photoacid generator, and combinations thereof. According to various embodiments, the crosslinker may be added in an amount of from about 5% to about 50% by weight of the matrix material. According to various embodiments, initiating the solidification may comprise exposing the matrix material to ultraviolet light. According to various embodiments, initiating the solidification may be done by elevating the temperature of the mold in a range of 30 to 150 degrees Celsius.

The method may further comprise removing at least a portion of the porogen to obtain the porous material. According to various embodiments, removing the porogen may comprise exposing at least the matrix material to a fluid. Exposing at least the matrix material to the fluid may comprise one selected from the group consisting of rinsing, soaking, flushing, and combinations thereof. According to various embodiments, removing the porogen may comprise exposing at least the matrix material to a vacuum. According to various embodiments, removing the porogen may comprise exposing at least the matrix material to an elevated temperature in the range of 30 to 1000 degrees Celsius.

The amounts of each component were previously given as weight percentages based on the total weight of the mixture. According to various embodiments, it is also useful describe the amounts of the components by volume. For example, according to various embodiments, the mixture may comprise the matrix material in an amount of from about 10 to about 40% by volume based on a total volume of the mixture. The mixture may comprise the plurality of particles in an amount of from about 10 to about 40% by volume based on a total volume of the mixture. The mixture may comprise the porogen in an amount of from about 30 to about 70% by volume based on a total volume of the mixture. The mixture may comprise the interfacial compatibilizer in an amount of about 1 to about 30% by volume based on a total volume of the mixture.

A variety of materials may be used as the matrix material. For example, according to various embodiments, the matrix material may be selected from the group consisting of a polymer, an oligomer, and combinations thereof. The matrix material may be an epoxy. The matrix material may be a multi-part epoxy. The matrix material may be a photocrosslinkable resin. The matrix material may be a thermally crosslinkable resin. The matrix material may be a thermoplastic resin. The matrix material may be a vitrimer resin.

A variety of materials may be used as the particles. For example, according to various embodiments, the plurality of particles may comprise at least one selected from the group consisting of activated carbon, silica, fumed silica, epoxidized silica, alumina, carbon nanotubes, graphite, graphene, titania, latex, silica aerogel, silica xerogel, carbon foam, silicone rubber, butadiene rubber, aluminum, gold, silver, cadmium selenide, boron nitride, and combinations thereof. As will be discussed hereinafter, the particles may have a wide range of sizes. According to various embodiments, the particles may have an activity. For example, the particles may have an activity selected from the group consisting of an antimicrobial activity, a catalytic activity, a plasmonic activity, a photoabsorbing activity, piezoelectric activity, and combinations thereof.

A variety of materials may be used as the porogen. For example, according to various embodiments, the porogen may be an oil. According to various embodiments, the oil may be selected from the group consisting of vegetable oil, petroleum oil, silicone oil, and combinations thereof.

A variety of materials may be used as the interfacial compatibilizer. For example, according to various embodiments, the interfacial compatibilizer may comprise an epoxidized oil. According to various embodiments, the epoxidized oil may be selected from the group consisting of an epoxidized soybean oil, an epoxidized alkane, an epoxy silicone, and combinations thereof.

According to various embodiments, the method may further comprise preparing a second mixture, wherein the second mixture is different than the first mixture, the second mixture comprising: from about 10 to about 30% by mass of a second matrix material, from about 20 to about 60% by mass of a second plurality of particles, from about 20 to about 60% by mass of a second porogen, and from about 1 to about 10% by mass of a second interfacial compatibilizer. The second matrix material and the second porogen may be phase separated in the second mixture. The method may further comprise placing the second mixture into the form adjacent to the first mixture. The term "adjacent" includes both abutting a disjointed configurations. The method may further include initiating a solidification of the second matrix material during which the second porogen remains nonvolatile and the second matrix material and the second porogen remain phase separated. Finally, the method may include removing at least a portion of the second porogen to obtain the porous material. The porous material may include a first portion and a second portion. The first portion may comprise the solidified matrix material from the first mixture and the second portion may comprise the solidified matrix material from the second mixture. As will be readily appreciated by a person having ordinary skill in the art any number of mixtures may be employed in this fashion.

Various embodiments relate to porous materials produced by any of the methods according to any of the embodiments described herein. The porous material, according to various embodiments, may exhibit low shrinkage by occupying a volume that is from about 85% to about 100% of a volume of the form. The porous material so produced may comprise a plurality of pores and a plurality of particles. According to various embodiments, each of at least a portion of the plurality of particles may comprise an embedded portion and an exposed portion, wherein the embedded portion is embedded within the matrix material, and wherein the exposed portion is exposed beyond a surface of at least one of the plurality of pores. According to various embodiments, at least the exposed portion may exhibit an activity selected from the group consisting of an antimicrobial activity, a catalytic activity, a reactive activity, a binding activity, a plasmonic activity, a photoabsorbing activity, a conductive activity, a piezoelectric activity, and combinations thereof. According to various embodiments, at least the exposed portion may be modified to exhibit an activity selected from the group consisting of an antimicrobial activity, a catalytic activity, a reactive activity, a binding activity, a photoabsorbing activity, a conductive activity, a piezoelectric activity, and combinations thereof. The modification may be selected from a thermal treatment, a chemical treatment, an electrodynamic treatment, a bioreaction treatment, and combinations thereof.

According to various embodiments, the porous material may comprise a plurality of portions. For example, according to various embodiments, the porous material may comprise a first portion and a second portion. The first portion may be prepared as described above. The second portion may be prepared by a method comprising: preparing a second mixture, wherein the second mixture is different than the first mixture, the second mixture comprising: from about 10 to about 30% by mass of a second matrix material, from about 20 to about 60% by mass of a second plurality of particles, from about 20 to about 60% by mass of a second porogen, and from about 1 to about 10% by mass of a second interfacial compatibilizer. The second matrix material and the second porogen may be phase separated in the second mixture. The method may further comprise placing the second mixture into the form adjacent to the first mixture; initiating a solidification of the second matrix material during which the second porogen remains nonvolatile and the second matrix material and the second porogen remain phase separated; and removing at least a portion of the second porogen to obtain the porous material. As will be readily appreciated by a person having ordinary skill in the art any number of mixtures may be employed in this fashion such that the porous material may have any number of portions with varying compositions. Of course, the same composition may be repeated.

Various embodiments relate to a microfluidic channel comprising a porous material. The microfluidic channel comprising the porous material may be produced by a method comprising preparing a mixture. The mixture may comprise from about 10 to about 30% by mass of a matrix material, from about 20 to about 60% by mass of a plurality of particles, from about 20 to about 60% by mass of a porogen, and from about 1 to about 10% by mass of an interfacial compatibilizer. According to various embodiments, the matrix material matrix material and the porogen may be phase separated in the mixture. The method may further comprise placing the mixture into a form; initiating a solidification of the matrix material during which the porogen remains nonvolatile and the matrix material and the porogen remain phase separated; and removing at least a portion of the porogen to obtain the microfluidic channel comprising the porous material. According to various embodiments, after the solidification the porous material may occupies a volume that is from about 85% to about 100% of a volume of the microfluidic channel. According to various embodiments, the solidification may comprise initiating a crosslinking reaction of the matrix material. Initiating the crosslinking reaction may be done before placing the mixture into the microfluidic channel.

According to various embodiments, the microfluidic channel may comprise a plurality of porous materials. For example, the microfluidic channel may further comprise a second porous material prepared by a method comprising: preparing a second mixture, herein the second mixture is different than the first mixture, the second mixture comprising: from about 10 to about 30% by mass of a second matrix material, from about 20 to about 60% by mass of a second plurality of particles, from about 20 to about 60% by mass of a second porogen, and from about 1 to about 10% by mass of a second interfacial compatibilizer. The second matrix material and the second porogen may be phase separated in the second mixture. The method may further comprise placing the second mixture into the microfluidic channel adjacent to the first mixture; initiating a solidification of the second matrix material during which the second porogen remains nonvolatile and the second matrix material and the second porogen remain phase separated; and removing at least a portion of the second porogen to obtain the microfluidic channel comprising the second porous material in addition to the first porous material. As will be readily appreciated by a person having ordinary skill in the art any number of mixtures may be employed in this fashion such that the porous material may have any number of portions with varying compositions. Of course, the same composition may be repeated.

These and other features, aspects, and advantages of various embodiments will become better understood with reference to the following description, figures, and claims.

BRIEF DESCRIPTION OF THE DRAWINGS

Embodiments are illustrated by way of example, and not by way of limitation, in the figures of the accompanying drawings in which like reference numerals refer to similar elements and in which.

Figure 1:
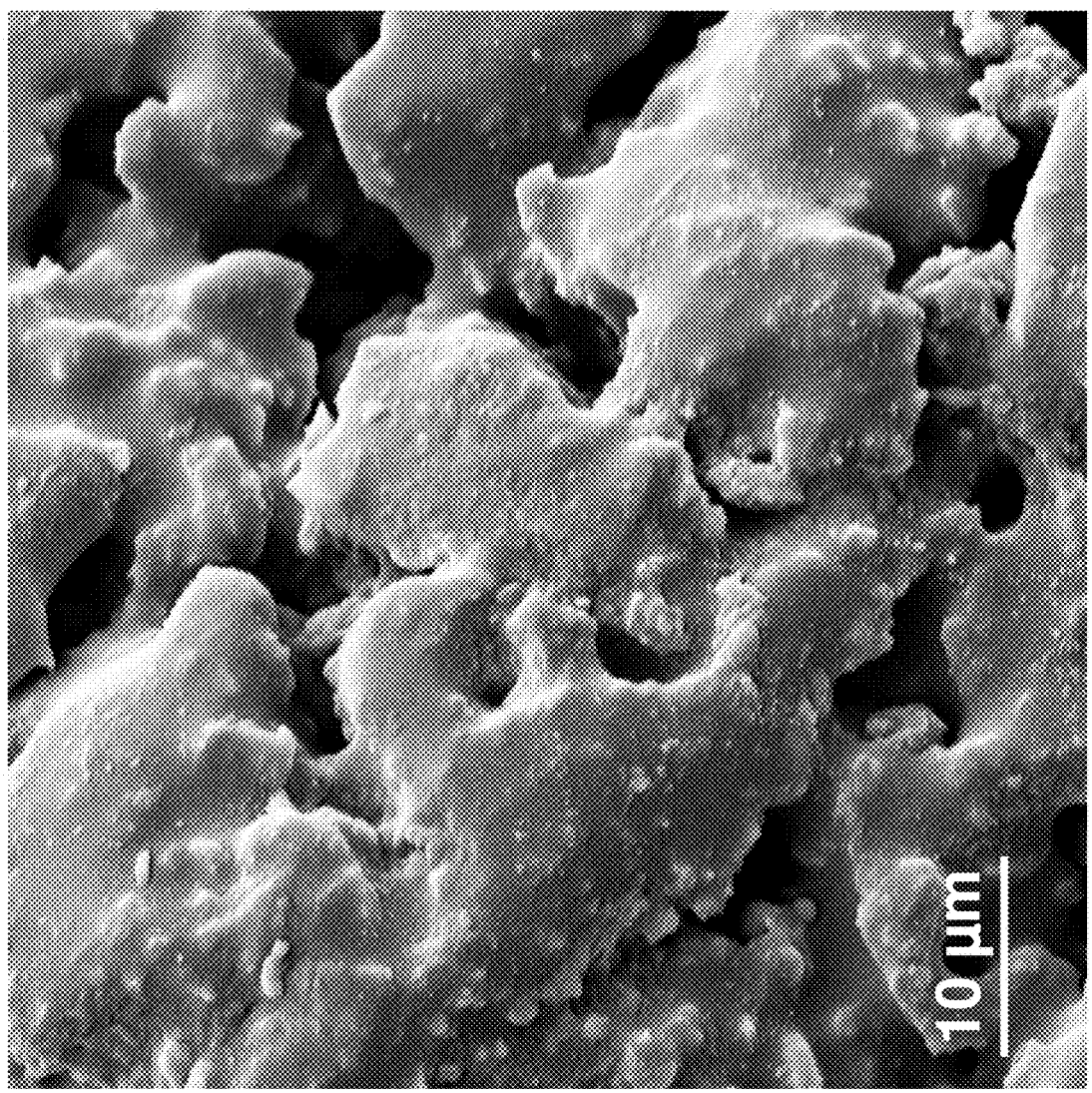
FIG. 1 is an example according to various embodiments, illustrating a scanning electron microscope (SEM) image of monoliths after porogen removal formed with the same amount of epoxy and particles with 7 wt % epoxidized oil and 13 wt % vegetable oil.

It should be understood that the various embodiments are not limited to the examples illustrated in the figures.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus, a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5× to 2×, for example, about 100 implies a value in a range from 50 to 200. Moreover, all ranges disclosed herein are to be understood to encompass any and all sub-ranges subsumed therein. For example, a range of "less than 10" for a positive only parameter can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Additional details for several embodiments are described in the Appendices, attached hereto. Any statement made in any appendix applies only to the embodiment in that appendices and not to other embodiments described elsewhere, unless specifically repeated.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element, or step modified by the article.

As discussed above, current methods to make porous monoliths require high temperature treatment, which incur significant materials loss and pore size shrinkage. Various embodiments described herein provide a way of creating porous materials that can be processed in ambient conditions, with reduced materials loss, and that result in a product that can be molded into forms of any size.

The method according to various embodiments described herein differs from the current technologies for producing porous polymers in many respects. For example, according to the method of various embodiments, the porogen may phase separate from the crosslinking phase during the whole reaction and the crosslinking phase may include a large fraction of particle fillers. According to various embodiments the particle fillers may be nanoparticle fillers. In addition, this porogen phase is nonvolatile during the extent of the crosslinking reaction. Here, "nonvolatile" indicates that a majority of the porogen remains until the final form of the phase-separated network is fixed or cured. Keeping the porogen phase separate from the crosslinking phase and also lacking in volatility during the whole reaction is similar to some crosslinking phase-separated gel systems, such as block copolymers or lyotropic liquid crystals. In these systems, crosslinked porous networks are created by adding a small amount of crosslinking agent or sol gel or using ultraviolet exposure to crosslink one domain of a system that would already be phase-separated due to a chemically induced phase separation that is restricted to a specific length scale. In lyotropic liquid crystals, that length scale is determined by a surfactant interacting with water and possibly an oil phase. If the surfactant has affinity for both phases, its lowest energy state is to distribute evenly at the interface. This sets a density of interface for equilibrium that creates bicontinuous networks of hydrophobic phase in water. By crosslinking the hydrophobic phase, the network is fixed, generally in the sub-50 nm scale. Similarly, recent developments in bijel materials have accomplished the same feat over a much larger range of network sizes by replacing the surfactant with particles, although these systems only work in a narrow range of designer chemistries and form on the volatile evaporation of a host solvent, necessitating considerable volumetric shrinkage.

Various embodiments relate to a method of producing engineered porous materials which can possibly be used as substrates for various applications such as satellite propulsion, filtration, and drug delivery. Various embodiments establish an approach for creating porous materials with tunable pore size, shape and surface chemistry. According to various embodiments, a porous material generating system may include a commercial two-part epoxy; a plurality of particles, such as silica; epoxidized soybean oil; and vegetable oil. Crosslinked porous networks are created by adding a small amount of crosslinking agent or sol gel or using ultraviolet exposure to crosslink one domain of a system that would already be microphase separated due to a chemically induced phase separation.

Various embodiments relate to a method of preparing a porous material. The method of preparing the porous material, may include a step of preparing a mixture. Preparing the mixture may be performed under a variety of conditions, the mixture may have a variety of properties and characteristics, the components of the mixture may each have a variety of properties and characteristics and may be present in the mixture in various amounts. For example, the mixture may be a bicontinuous emulsion. As used herein, the term "bicontinuous emulsion" refers to a type of emulsion wherein the aqueous or polar phase and the oily or non-polar phases are characterized as both being continuous. Here "aqueous/non-aqueous" and "polar/non-polar" are used as common examples of phase-separating media; however, such emulsions may be prepared using other chemical non-compatibilities. According to various embodiments, it is an advantage of the present invention that the step of preparing the mixture may be accomplished at ambient conditions, for example, at room temperature and pressure. Alternatively, the mixture may be accomplished at a temperature within a range having a lower limit and/or an upper limit. The range may include or exclude the lower limit and/or the upper limit. The lower limit and/or upper limit can be selected from about 25, 30, 35, 40, 45, 50, 55, 60, 65, 70, 75, 80, 85, 90, 95, 100, 105, 110, 115, 120, 125, 130, 135, 140, 145, 150, 155, and 160 degrees Celsius. For example, according to certain embodiments, the mixture may be accomplished at a temperature in a range of 30 to 150 degrees Celsius, or any combination of lower limits and upper limits described. Furthermore, the mixture may include a variety of components. The amount of each component may be specified by mass or by volume. For purposes of this disclosure, when an amount of a component is specified by volume, then normal temperature and pressure are implied. According to various embodiments, the mixture may include a matrix material, a plurality of particles, a porogen, and an interfacial compatibilizer.

The matrix material may have a variety of properties and characteristics and may be present in the mixture in various amounts. For example, according to various embodiments, the matrix material may be selected from a polymer, an oligomer, and combinations thereof. The matrix material may be a resin such as a photocrosslinking or photopolymerizing resin, a thermally crosslinking resin, a vitrimer resin, or a thermoplastic resin. The matrix material may be an epoxy. Vitrimers are a class of plastics, which are derived from thermosetting polymers (thermosets) and are very similar to them. Vitrimers consist of molecular, covalent networks, which can change their topology by thermally activated bond-exchange reactions. The matrix material may, for example, be a multi-part epoxy, such as a 2-part epoxy. According to various embodiments, the mixture may include an amount of the matrix material within a range having a lower limit and/or an upper limit. The range may include or exclude the lower limit and/or the upper limit. The lower limit and/or upper limit can be selected from about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, and 40% by mass based on the total mass of the mixture. For example, according to certain embodiments, the mixture may include from about 10 to about 30% by mass of the matrix material, or any combination of lower limits and upper limits described. According to various embodiments, the mixture may include the matrix material in an amount within a range having a lower limit and/or an upper limit. The range may include or exclude the lower limit and/or the upper limit. The lower limit and/or upper limit can be selected from about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, and 50% by volume based on the total volume of the mixture. For example, according to certain embodiments, the mixture comprises the matrix material in an amount of from about 10 to about 40% by volume based on a total volume of the mixture, or any combination of lower limits and upper limits described.

The porogen may have a variety of properties and characteristics and may be present in the mixture in various amounts. For example, according to various embodiments, the porogen may be an oil. The oil may be any suitable oil, including one selected from vegetable oil, petroleum oil, silicone oil, and combinations thereof. According to various embodiments, the mixture may include the porogen in an amount within a range having a lower limit and/or an upper limit. The range may include or exclude the lower limit and/or the upper limit. The lower limit and/or upper limit can be selected from about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, and 70% by mass based on the total mass of the mixture. For example, according to certain embodiments, the mixture may include the porogen in an amount of from about 20 to about 60% by mass, or any combination of lower limits and upper limits described. According to various embodiments, the mixture may include the porogen in an amount within a range having a lower limit and/or an upper limit. The range may include or exclude the lower limit and/or the upper limit. The lower limit and/or upper limit can be selected from about 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, and 75% by volume based on the total volume of the mixture. For example, according to certain embodiments, the mixture may include the porogen in an amount of from about 30 to about 70% by volume based on a total volume of the mixture, or any combination of lower limits and upper limits described.

The interfacial compatibilizer may have a variety of properties and characteristics and may be present in the mixture in various amounts. For example, according to various embodiments, the interfacial compatibilizer may include an epoxidized oil. The epoxidized oil may be any suitable epoxidized oil, such as one selected from an epoxidized soybean oil, an epoxidized alkane, epoxy silicone, and combinations thereof. According to various embodiments, the mixture may include the interfacial compatibilizer in an amount within a range having a lower limit and/or an upper limit. The range may include or exclude the lower limit and/or the upper limit. The lower limit and/or upper limit can be selected from about 1, 2, 3, 4, 5, 6, 7, 8, 9, 10, 11, 12, 13, 14, 15, 16, 17, 18, 19, 20, 21, 22, 23, 24, and 25% by mass based on the total mass of the mixture. For example, according to certain embodiments, the mixture may include the interfacial compatibilizer in an amount of from about 1 to about 10% by mass, or any combination of lower limits and upper limits described. According to various embodiments, the mixture may include the interfacial compatibilizer in an amount within a range having a lower limit and/or an upper limit. The range may include or exclude the lower limit and/or the upper limit. The lower limit and/or upper limit can be selected from about 1, 2, 3, 4, 5, 6, 7, 8, 9, 10, 11, 12, 13, 14, 15, 16, 17, 18, 19, 20, 21, 22, 23, 24, 25, 26, 27, 28, 29, and 30% by volume based on the total volume of the mixture. For example, according to certain embodiments, the mixture may include the interfacial compatibilizer in an amount of from about 3 to about 10% by volume based on a total volume of the mixture, or any combination of lower limits and upper limits described.

According to various embodiments, the surfactant agent may be selected so as to be fully miscible with both the matrix material (for example, the epoxy) and the porogen. Such that when the three materials are mixed, it will have a tendency to segregate to the porogen-epoxy interface. According to various embodiments, the interfacial compatibilizer may be selected such that it is an effective surfactant for two hydrophobic phases of the mixture. This can trigger a phase separation into an emulsion of epoxy-in-oil or oil-in-epoxy depending on the proportion. Upon crosslinking, the three-part emulsion macrophase may then separate to a light phase (likely oil rich) on top and an epoxy rich phase underneath. This is due to the large density mismatch and low viscosities of the oil phase. This is where, according to various embodiments, the particle fillers become especially important. The particles may be selected to favor the epoxy phase or the epoxy-oil interface, greatly increasing its viscosity. As a result, the macrophase separation is not possible and, further, the texture induced by the particles appears to create a bicontinuous network within a specific compositional range.

Generally, the plurality of particles may have a variety of properties and characteristics and may be present in the mixture in various amounts. According to various embodiments, the plurality of particles may include at least one selected from activated carbon, silica, fumed silica, epoxidized silica, alumina, carbon nanotubes, boron nitride nanotubes, graphite, graphene, titania, barium titanate, latex, silica aerogel, silica xerogel, carbon foam, silicone rubber, butadiene rubber, aluminum, gold, silver, cadmium selenide, boron nitride, chitosan powder, and combinations thereof. The particles may be any size or any combination of sizes. The particles may include nano-scale particles, micro-scale particles, and/or particles smaller or larger. Without wishing to unnecessarily limit the scope of the invention, which can employ particles of any size, some examples of nano-scale-sized particles and micro-scale-sized particles are provided. Nano-scale particles may have an average diameter within a range having a lower limit and/or an upper limit. The range may include or exclude the lower limit and/or the upper limit. The lower limit and/or upper limit can be selected from about 5, 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 500, 600, 700, 800, and 900 nm. For example, according to certain embodiments, the particles may have an average diameter from about 10 nm to about 300 nm, or any combination of lower limits and upper limits described. Micro-scale particles may have an average diameter within a range having a lower limit and/or an upper limit. The range may include or exclude the lower limit and/or the upper limit. The lower limit and/or upper limit can be selected from about 5, 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 500, 600, 700, 800, and 900 µm. For example, according to certain embodiments, the particles may have an average diameter from about 1 µm to about 20 µm, or any combination of lower limits and upper limits described. According to other embodiments, the particles may have a size of about 20 µm or less.

According to various embodiments, the particles may have an activity selected from an antimicrobial activity, a catalytic activity, and combinations thereof. According to various embodiments, the mixture may include the plurality of particles in an amount within a range having a lower limit and/or an upper limit. The range may include or exclude the lower limit and/or the upper limit. The lower limit and/or upper limit can be selected from about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, and 90% by mass based on the total mass of the mixture. For example, according to certain embodiments, the mixture may include the plurality of particles in an amount from about 20 to about 80% by mass based on the total mass of the mixture, or any combination of lower limits and upper limits described. According to various embodiments, the mixture may include the plurality of particles in an amount within a range having a lower limit and/or an upper limit. The range may include or exclude the lower limit and/or the upper limit. The lower limit and/or upper limit can be selected from about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 55, 60% by volume based on the total volume of the mixture. For example, according to certain embodiments, the mixture may include the plurality of particles in an amount of from about 10 to about 40% by volume or of greater than 5% by volume based on a total volume of the mixture, or any combination of lower limits and upper limits described.

One complication associated with the addition of particles is that, according to various embodiments, and depending on the amount of particles employed, hand mixing may be impossible. This is not only because of the increased viscosity, but also because of the air that becomes trapped in the paste during manual mixing. Instead of hand mixing, various embodiments may employ mechanical mixing, such as via a Flacktek Speedmixer®, which utilizes mixing speeds of up to 3000 rpm in two axes to create air-free homogenized mixtures. The viscosity of this paste does not allow for macrophase separation during curing and, depending on the composition, can range from a toothpaste-like to putty-like viscosity.

The viscosity of the paste, in particular, is highly advantageous for processing. Molding into micro or nanostructures requires a certain range of viscosity where viscous forces are much greater in magnitude than capillary forces. Further, the long lifetime of the homogenization allows for structures that are of a nearly arbitrary scale.

Figure 6:
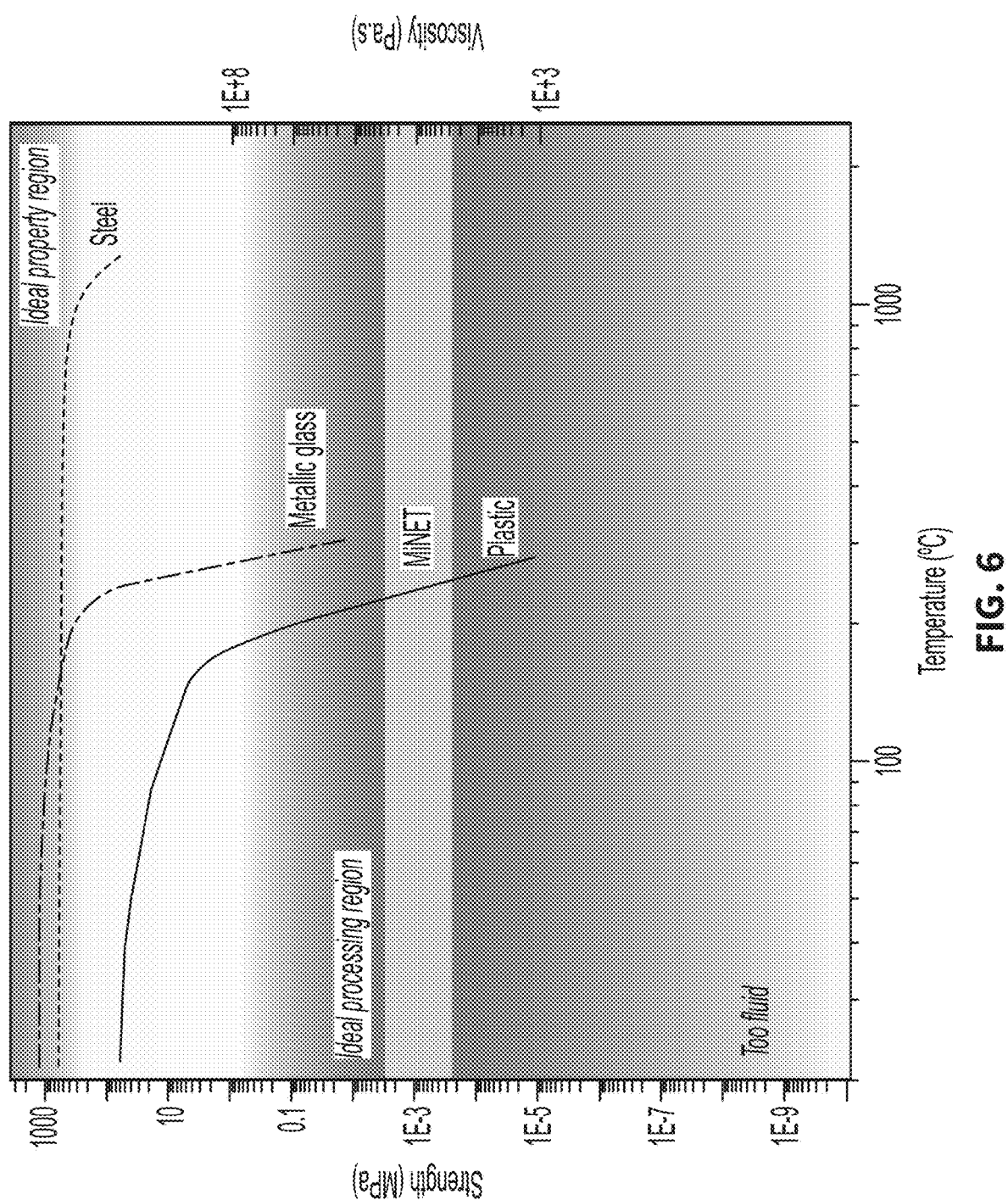
FIG. 6 is an example according to various embodiments, illustrating observed viscosity values at room temperature before curing for porous materials according to various embodiments overlaid upon a known relationship between strength, viscosity, and temperature to define an ideal processing region.
Figure 7:
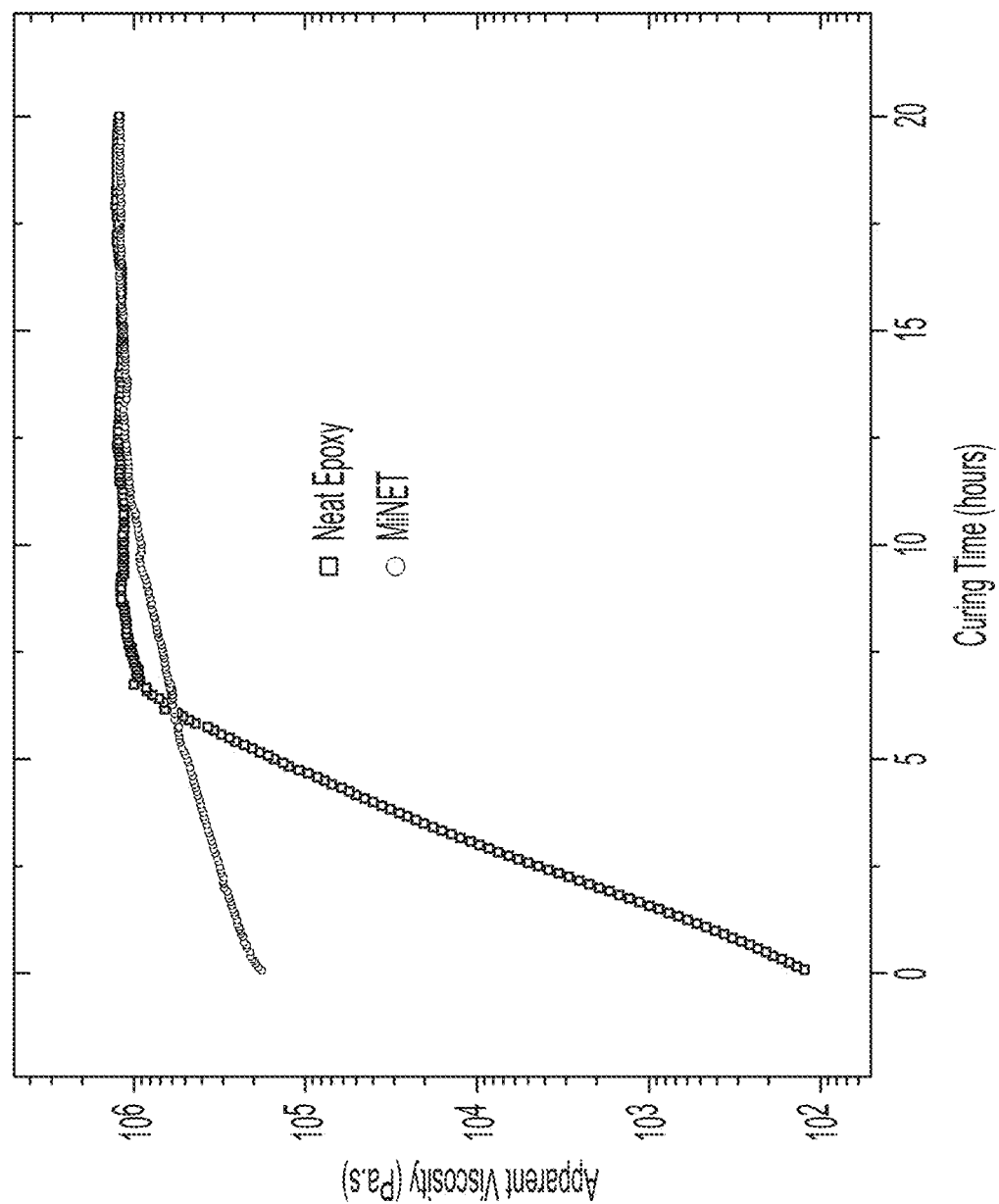
FIG. 7 is an example according to various embodiments, illustrating a relationship between apparent viscosity and curing time for both neat epoxy and various embodiments.

FIG. 6 is an example according to various embodiments, illustrating observed viscosity values at room temperature before curing for porous materials according to various embodiments overlaid upon a known relationship between strength, viscosity, and temperature to define an ideal processing region. These viscosities range from about $1\times10^4$ to about $1\times10^6$ Pa·s and place them in the ideal processing range without requiring a change in temperature. FIG. 7 is an example according to various embodiments, illustrating a relationship between apparent viscosity and curing time for both neat epoxy and various embodiments.

Figure 8:
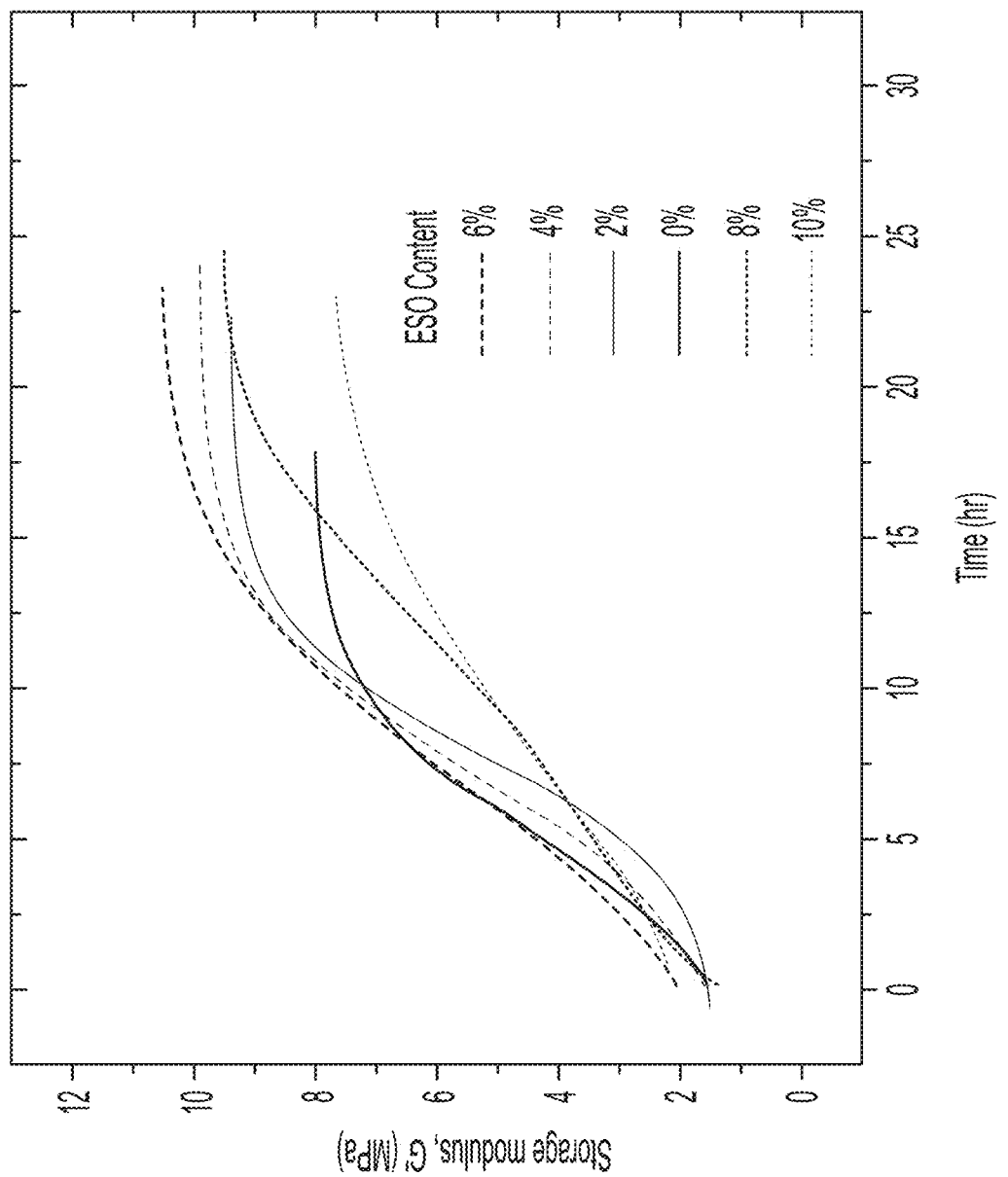
FIG. 8 is an example according to various embodiments, illustrating a relationship between apparent viscosity and curing time for various embodiments demonstrating an ideal amount of epoxidized soy oil (ESO) that results in the stiffest monolith.

FIG. 8 demonstrates various embodiments formulated with different proportions of interfacial compatibilizer indicating a signature of the ideal proportion of compatibilizer (for this formulation, 6%), as indicated by (1) the highest starting storage modulus and (2) the highest final storage modulus.

According to various embodiments, the mixture may be prepared in a form or the mixture may be prepared and then placed into a form. The form may be any structure, such as a mold or at least a portion of a microfluidic channel. The mold may impart a desired shape and size to the resulting porous material. Of course, the method of preparing the porous material, may include a step of removing the porous material from the form to produce at least one porous monolith.

The method of preparing the porous material may include a step of initiating a solidification of the matrix material. Initiating the solidification may be accomplished in a variety of ways. According to various embodiments, initiating the solidification may include initiating a crosslinking reaction of the matrix material. According to various embodiments, the step of initiating a crosslinking reaction of the matrix material may include adding a crosslinker to the mixture. The crosslinker may be selected based on crosslinking polymer/resin. For example, according to various embodiments, the crosslinker may be selected from commercial amine, peroxide, or other agents and may be activated either through photo or thermal means by triggering epoxide, urethane, thiol, free radical or other mechanisms. According to various embodiments, the crosslinker may bond to the matrix material and thereby become incorporated into the resulting porous material. If the means of crosslinking is photoactivation, the component identified as "crosslinker" may optionally include a photosensitizer, such as rhodamine, 2-Isopropylthioxanthone, porphyrin, squaraine, and other UV or visible absorbing materials. The crosslinker may be added in an amount within a range having a lower limit and/or an upper limit. The range may include or exclude the lower limit and/or the upper limit. The lower limit and/or upper limit can be selected from about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 40, 41, 42, 43, 44, 45, 46, 47, 48, 49, and 50% by weight. For example, according to certain embodiments, the crosslinker may be added in an amount of from about 5% to about 25% by weight, or any combination of lower limits and upper limits described. According to various embodiments, the step of initiating a crosslinking reaction of the matrix material may include exposing the matrix material to ultraviolet light. The step of initiating a crosslinking reaction of the matrix material may be done before or after placing the mixture into the form.

According to various embodiments, the step of initiating a crosslinking reaction of the matrix material may be done by elevating the temperature of the mold. The mold may be elevated to a temperature within a range having a lower limit and/or an upper limit. The range may include or exclude the lower limit and/or the upper limit. The lower limit and/or upper limit can be selected from about 25, 30, 35, 40, 45, 50, 55, 60, 65, 70, 75, 80, 85, 90, 95, 100, 105, 110, 115, 120, 125, 130, 135, 140, 145, 150, 155, and 160 degrees Celsius. For example, according to certain embodiments, the mold may be elevated to a temperature in a range of 30 to 150 degrees Celsius, or any combination of lower limits and upper limits described.

The method of preparing the porous material, may include a step of removing at least a portion of the porogen to obtain the porous material. The step of removing the porogen may include exposing the matrix material to a fluid. Exposing the matrix material to the fluid to remove the porogen may be done in any suitable manner, include one selected from rinsing, soaking, flushing, and combinations thereof. For example, the matrix material may be rinsed, soaked, and/or flushed with the fluid to remove the matrix material. The fluid may be selected from the solvents in which the porogen gets dissolved. According to various embodiments, the solvent may be selected from water, methanol, ethanol, butanol, terpineol, acetone, butanone, propylene glycol monomethyl ether acetate, ethyl acetate, ethylene glycol, toluene, xylene, heptane, hexane, hexanes, cyclohexane, hexadecane, silicone oil, vegetable oil, alkane oil, and combinations thereof.

According to various embodiments, removing the porogen may include exposing the matrix material to a vacuum.

According to various embodiments, removing the porogen may include exposing the matrix material to an elevated temperature, which may be also used to alter the matrix or particle materials. The matrix or particle materials may be exposed to a temperature within a range having a lower limit and/or an upper limit. The range may include or exclude the lower limit and/or the upper limit. The lower limit and/or upper limit can be selected from about 25, 30, 35, 40, 45, 50, 55, 60, 65, 70, 75, 80, 85, 90, 95, 100, 105, 110, 115, 120, 125, 130, 135, 140, 145, 150, 155, 160, 170, 180, 190, 200, 225, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, and 1000 degrees Celsius. For example, according to certain embodiments, the matrix material may be exposed to a temperature in a range of 30 to 150 degrees Celsius, or any combination of lower limits and upper limits described.

Various embodiments relate to a porous material produced by any of the methods descried herein. For example, various embodiments relate to a porous material produced by a method that includes preparing a mixture, the mixture comprising: from about 10 to about 30% by mass of a matrix material, from about 20 to about 60% by mass of a plurality of particles, from about 20 to about 60% by mass of a porogen, and from about 1 to about 10% by mass of an interfacial compatibilizer; placing the mixture into a form; initiating a crosslinking reaction of the matrix material; and removing at least a portion of the porogen to obtain the porous material.

Advantageously, according to various embodiments, the porous material produced by the methods described herein may exhibit low shrinkage relative to the form. As used herein, the term "low shrinkage" means that the porous material may occupying a volume that is from about 85% to about 100% of a volume of the form. Indeed, according to various embodiments, the porous material produced by the methods described herein may exhibit a low shrinkage by occupying a volume that is within a range having a lower limit and/or an upper limit. The range may include or exclude the lower limit and/or the upper limit. The lower limit and/or upper limit can be selected from about 85, 86, 87, 88, 89, 90, 91, 92, 93, 94, 95, 96, 97, 98, 99, and 100% of a volume of the form. For example, according to certain embodiments, the porous material produced by the methods described herein may exhibit a low shrinkage by occupying a volume that is from about 85% to about 100% of a volume of the form, or any combination of lower limits and upper limits described.

The porous material produced by the methods described herein may include a plurality of pores. According to various embodiments, each of at least a portion of the plurality of particles may include an embedded portion and an exposed portion. The embedded portion may be embedded within the matrix material, and the exposed portion is exposed beyond a surface of at least one of the plurality of pores. According to various embodiments, at least the exposed portion may exhibit beneficial activity, such as an activity selected from an antimicrobial activity, a catalytic activity, a plasmonic activity, a photoabsorbing activity, piezoelectric activity, and combinations thereof.

Various embodiments relate to a kit for preparing a porous material. The kit may include the components of the mixture described above, and optionally a crosslinker. For example, the kit may include from about 10 to about 30% by mass of a matrix material, from about 20 to about 60% by mass of a plurality of particles, from about 20 to about 60% by mass of a porogen, and from about 1 to about 10% by mass of an interfacial compatibilizer. If present, the crosslinker may be kept isolated from all of the other components or at least from the matrix material. The crosslinker is optional because, the crosslinking reaction may be initiated in other ways, for example by exposing the mixture to sufficient ultraviolet light or temperature as to chemically alter the resin. In some embodiments, the resin may also not be crosslinked, but rather hardened by cooling through a solidification and/or glass transition.

Various embodiments relate to a microfluidic channel that includes a porous material. The microfluidic channel may be or be intended to be a component of a microfluidic device, such as, for example, a microfluidic chip. The porous material may exhibit "low shrinking" with respect to the microfluidic channel, as discussed herein. The method and the "low shrinkage" achieved thereby, may result a fluidic chip where the monolith is directly introduced into the channel before curing and adheres to the walls of the fluidic channel in the chip such that a seal is formed. According to various embodiments, the seal may be sufficient such that all of the fluid in the channel passes through the monolith rather than around it. The microfluidic channel including the porous material may be produced by any of the methods described herein. For example, the microfluidic channel including the porous material may be produced by a method comprising preparing a mixture, the mixture comprising: from about 10 to about 30% by mass of a matrix material, from about 20 to about 60% by mass of a plurality of particles, from about 20 to about 60% by mass of a porogen, and from about 1 to about 10% by mass of an interfacial compatibilizer; placing the mixture into the microfluidic channel; initiating a crosslinking reaction of the matrix material; and removing at least a portion of the porogen to obtain the microfluidic channel comprising the porous material. According to various embodiments, the step of initiating the crosslinking reaction of the matrix material may be done before or after placing the mixture into the microfluidic channel.

According to various embodiments, multiple porous monoliths may be cured together to provide abrupt changes in porosity within the same monolith and therefore within various portions of the microfluidic channel. Example 14 provides a demonstration. With respect to the preparation of a microfluidic channel, having multiple porous monoliths, the microfluidic channel including the porous material may be produced by a method comprising preparing a first mixture, the first mixture comprising: from about 10 to about 30% by mass of a first matrix material, from about 20 to about 60% by mass of a first plurality of particles, from about 20 to about 60% by mass of a first porogen, and from about 1 to about 10% by mass of a first interfacial compatibilizer; preparing a second mixture, the second mixture comprising: from about 10 to about 30% by mass of a second matrix material, from about 20 to about 60% by mass of a second plurality of particles, from about 20 to about 60% by mass of a second porogen, and from about 1 to about 10% by mass of a second interfacial compatibilizer; placing the first mixture and the second mixture into the microfluidic channel; initiating a crosslinking reaction of the first matrix material and the second matrix material; and removing at least a portion of the first porogen and the second porogen to obtain the microfluidic channel comprising the porous material. According to various embodiments, the step of initiating the crosslinking reaction of the first matrix material and the second matrix material may be done before or after placing the mixtures into the microfluidic channel. Any number of mixtures may be prepared. The mixtures may be placed into the microfluidic channel in any configuration. The possible configurations include at least abutting configurations and disjointed configurations. According to abutting configurations, the first mixture contacts at least a portion of the second mixture. According to disjointed configurations, the first mixture does not directly contact the second mixture. Combinations of abutting and disjointed configurations may be employed. The first mixture and the second mixture may include different materials or different loadings of materials. For example, the first mixture may include particles having a different size than the second mixture. Another example would be a mixture where the first mixture has the same size as the second, but the particles are different types (e.g. a metal and a non-metal).

Microfluidic approaches have demonstrated an extreme degree of control necessary for the testing of porous systems. Various embodiments allow for the integration of porous materials into microfluidic channels, and further, do so in a means that is compatible with in situ imaging Such embodiments open the doors for a wide range of experiments on porous media that would otherwise be impossible. To this end, various embodiments provide multicomponent porous epoxies. These materials rely on a phase separation of bicontinuous microstructures induced by surfactant-like materials that reside at the interface of a multiphase system of epoxy, particles, and a nonvolatile liquid porogen. The pore structure may be defined by the phase separation and curing before the removal of the porogen, which can be done without shrinkage of the superstructure. Tuning of this system can lead to high-viscosity materials that can be molded into micro or macrostructures. These materials may be useful for in situ observation of homogeneous, mixed, and particulate flows within porous media.

Some potential applications of the methods and materials according to various embodiments include energy conversion, CubeSat and other satellite propulsion, tissue engineering, and smart filtering.

EXAMPLES

Examples 1-2

A purpose of Examples 1 and 2 is to demonstrate results obtained, according to various embodiments. More specifically, these examples show results obtained at a transition of mixed to bicontinuous of a monolith created with a plurality of activated carbon particles having an average size of about 100 nm (obtained from Skyspring Nanomaterials) after removal of the oil. While both examples are bicontinuous, the morphological differences are stark despite the main compositional shift being in the porogen phase, indicating the importance of all components in the process. Molding into micro or nanostructures requires a certain range of viscosity where viscous forces are much greater in magnitude than capillary forces. Further, the long lifetime of the homogenization allows for structures that are of a nearly arbitrary scale.

Example 1

First, the specific amount of two-part epoxy, particles, epoxidized oil, and vegetable oil are placed in a mixing cup. In a specific example shown in FIG. 1, the composite was made of 9.52 wt % Epon 828 (Hexion Inc.) epoxy resin, 9.52 wt. % Versamid 125 (Gabriel Performance Products) curing agent, 4.77 wt % epoxidized soybean oil (from Arkema Inc.), 44.62 wt % canola oil, and 28.58 wt % activated carbon (100 nm, Skyspring Nanomaterials). The components were speed mixed for 1 minute in a Flacktek Speedmixer at 3500 RPM. After the composite gets cured, to make it porous, the porogen (canola oil) was removed by submerging the monolith of the composite into acetone bath for at least 1 day. Finally, the porous composite was dried in air.

FIG. 1 is an example according to various embodiments, illustrating a scanning electron microscope (SEM) image of monoliths after porogen removal. The revised composition of the monoliths after porogen removal is: 18.18 wt % Epon 828 (Hexion Inc.) epoxy resin, 18.18 wt. % Versamid 125 (Gabriel Performance Products) curing agent, 9.10 wt % epoxidized soybean oil, and 54.54 wt % activated carbon (100 nm).

Example 2

First, the specific amount of two-part epoxy, particles, epoxidized oil, and vegetable oil are placed in a mixing cup. In a specific example shown in FIG. 1, the composite was made of 8.00 wt % Epon 828 (Hexion Inc.) epoxy resin, 8.00 wt. % Versamid 125 (Gabriel Performance Products) curing agent, 4.00 wt % epoxidized soybean oil (from Arkema Inc.), 40.00 wt % canola oil, and 40.00 wt % activated carbon (100 nm). The components were speed mixed for 1 minute in a Flacktek Speedmixer at 3500 RPM. After the composite gets cured, to make it porous, the porogen (canola oil) was removed by submerging the monolith of the composite into acetone bath for at least 1 day. Finally, the porous composite was dried in air.

Figure 2:
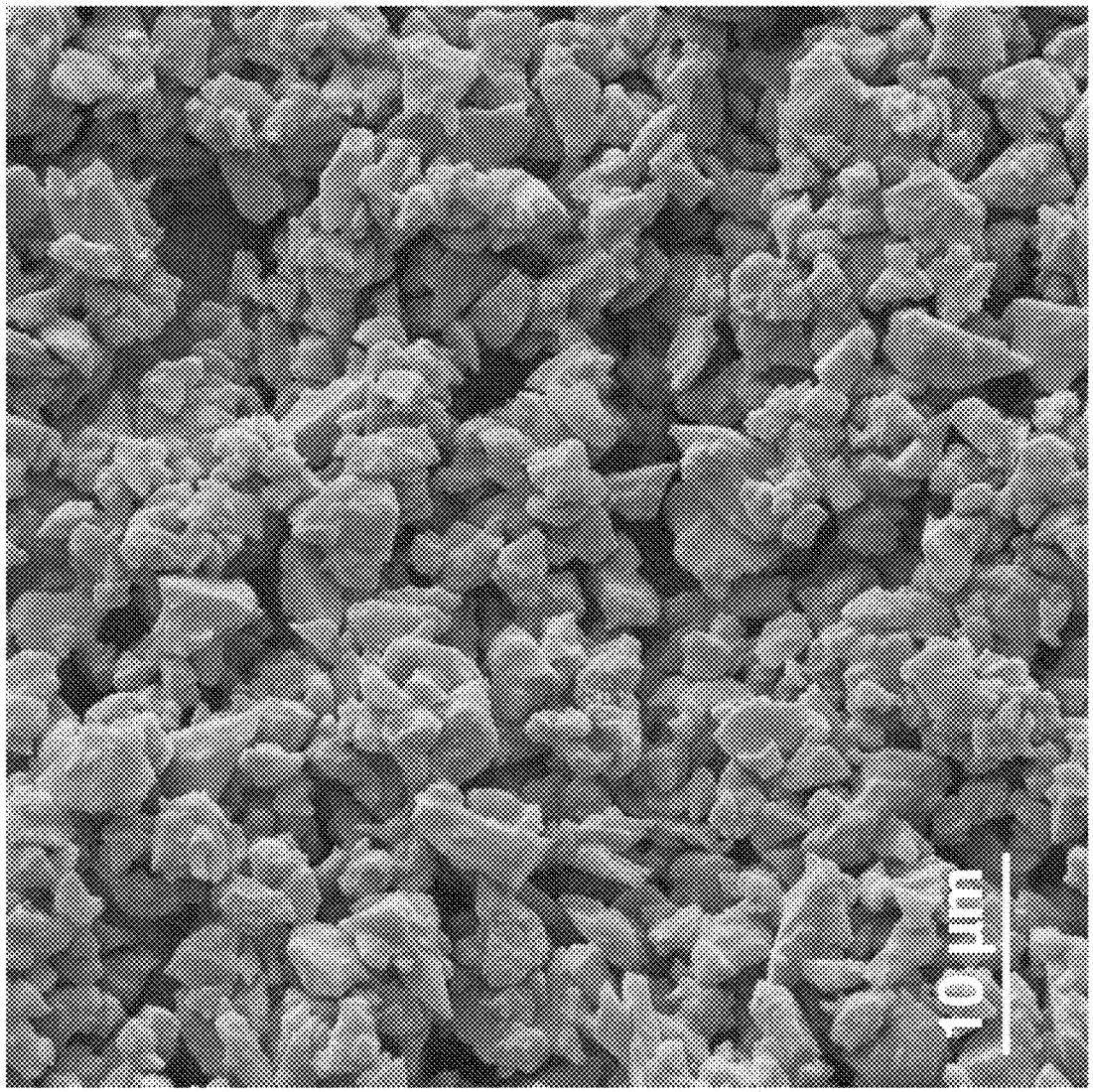
FIG. 2 is an example according to various embodiments, illustrating a scanning electron microscope (SEM) images of monoliths after porogen removal formed with the same amount of epoxy and particles with 2 wt % epoxidized oil and 39 wt % vegetable oil.

FIG. 2 is an example according to various embodiments, illustrating a scanning electron microscope (SEM) images of monoliths after porogen removal. The revised composition of the monoliths after porogen removal is: 13.13 wt % Epon 828 (Hexion Inc.) epoxy resin, 13.13 wt. % Versamid 125 (Gabriel Performance Products) curing agent, 6.67 wt % epoxidized soybean oil, and 66.67 wt % activated carbon (100 nm).

Examples 3

Figure 3:
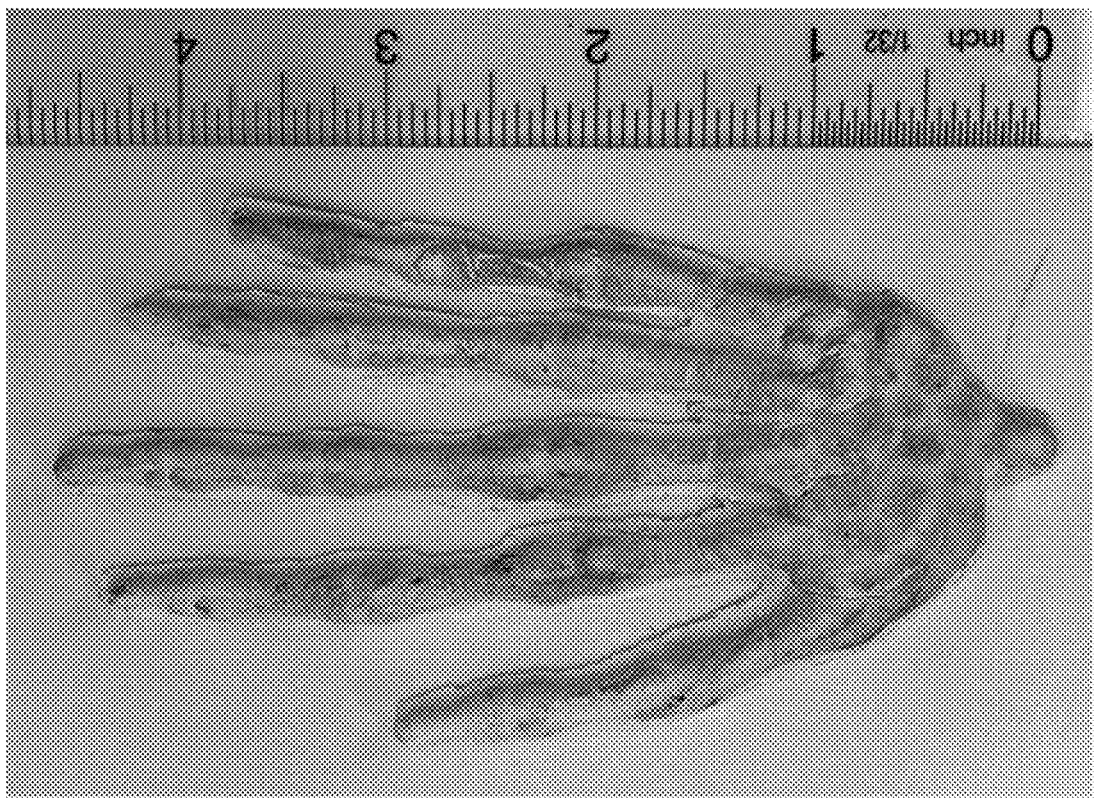
FIG. 3 is an example according to various embodiments, illustrating a photograph of a porous epoxy composite monolith structure, specifically a macroscale bone analog.

A purpose of Examples 3 is to demonstrate molding of the porous materials according to various embodiments into forms of a nearly arbitrary scale, including but not limited to micro-scale or nano-scale forms. FIG. 3 shows a demonstration of a macroscale molded part using this technique. More specifically, FIG. 3 shows a porous epoxy composite monolith structures assembled at a cm scale.

First, to make a composite, 4.81 wt % Epon 828 (Hexion Inc.) epoxy resin, 4.81 wt. % Versamid 125 (Gabriel Performance Products) curing agent, 1.93 wt % epoxidized soybean oil (from Arkema Inc.), 21.15 wt % canola oil, and 67.30 wt % silica nanoparticles (400 nm) were placed in a mixing cup. Second, the ingredients are mixed using Flacktek Speedmixer at 3000 rpm for 1 min. Third, the mixed composite had putty-like viscosity which was pressed against a skeleton hand mold/template. The composite was cured at room temperature for 24 hours. After the composite was cured, the composite-template attachment was placed in acetone bath for 8 hours. Acetone drives out the porogen (canola oil) from the composite which resulted in porous structure. Finally, the porous composite was detached from the template and dried in air.

FIG. 3 is an example according to various embodiments, illustrating a photograph image of a porous epoxy composite monolith structure, specifically a bone analog.

Examples 4-5

A purpose of Examples 4-5 is to demonstrate porous epoxy microstructures synthesized from different particle precursors.

According to various embodiments the resultant microstructure may depend on the particles that are added. Examples 4-5, along with Example 2, show characteristic results arising from different particle types. Without wishing to be bound by theory, it is hypothesized that this has to do with a combination of particle chemistry, particle size, and/or particle roughness/fractality. The importance of particle chemistry is evident on the macroscale, as has been discussed, with some particles not segregating into the epoxy phase. This is evidenced by much longer curing times, indicating complete mixing of the components.

Example 4

First, to make a composite, 8.89 wt % Epon 828 (Hexion Inc.) epoxy resin, 8.89 wt. % Versamid 125 (Gabriel Performance Products) curing agent, 4.44 wt % epoxidized soybean oil (from Arkema Inc.), 44.44 wt % canola oil, and 33.34 wt % silica nanoparticles (60 nm, Skyspring Nanomaterials) were placed in a mixing cup. Second, the ingredients are mixed using Flacktek Speedmixer at 3000 rpm for 1 min. The composite was cured at room temperature for 24 hours. After the composite was cured, the composite-template attachment was placed in acetone bath for 8 hours. Acetone drives out the porogen (canola oil) from the composite which resulted in porous structure. Finally, the porous composite was detached from the template and dried in air.

Figure 4:
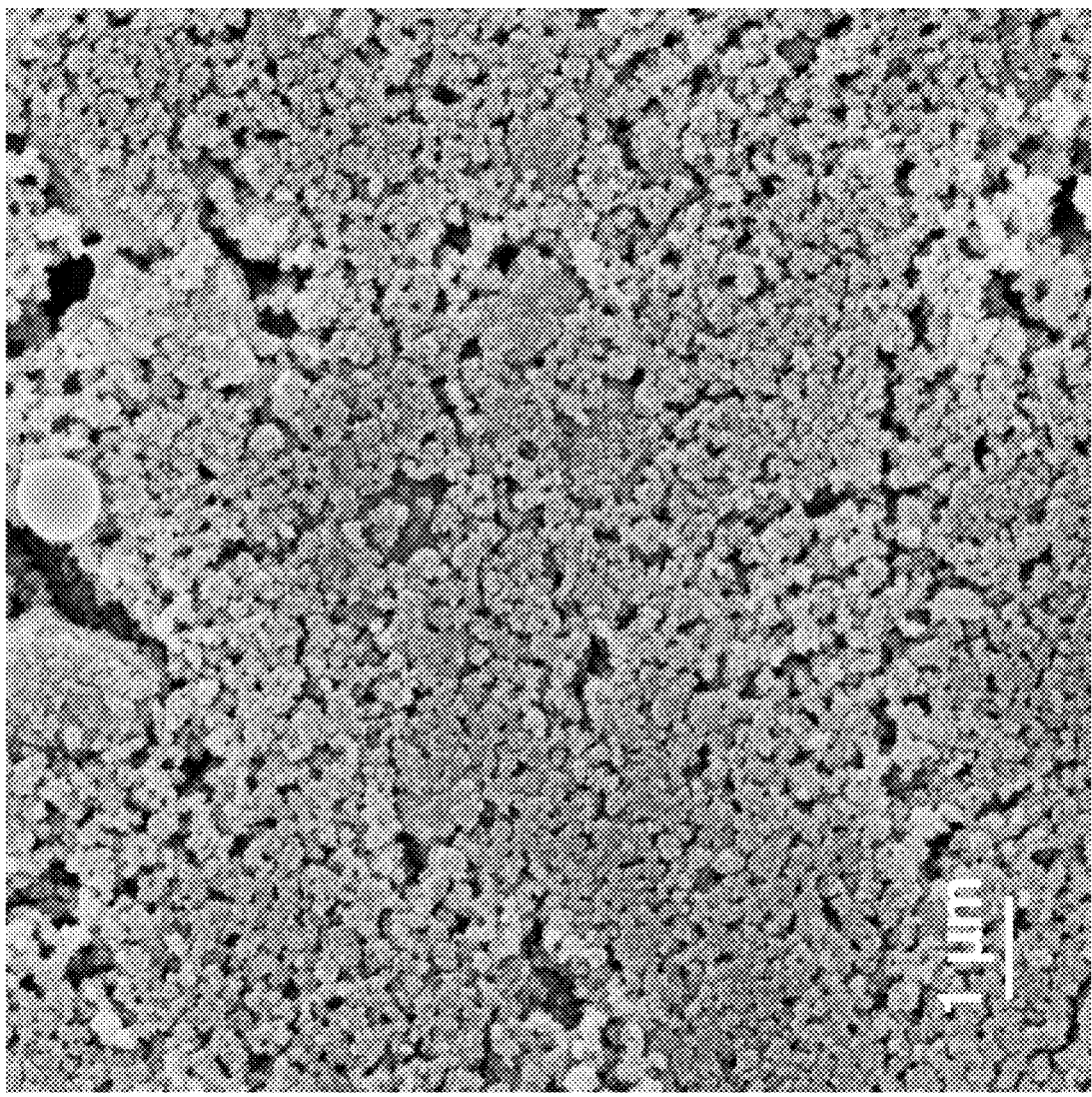
FIG. 4 is an example according to various embodiments, illustrating an SEM image of a porous epoxy microstructures synthesized from 60 nm fumed silica particles.

FIG. 4 is an example according to various embodiments, illustrating an SEM image of a porous epoxy microstructures.

Example 5

Figure 5:
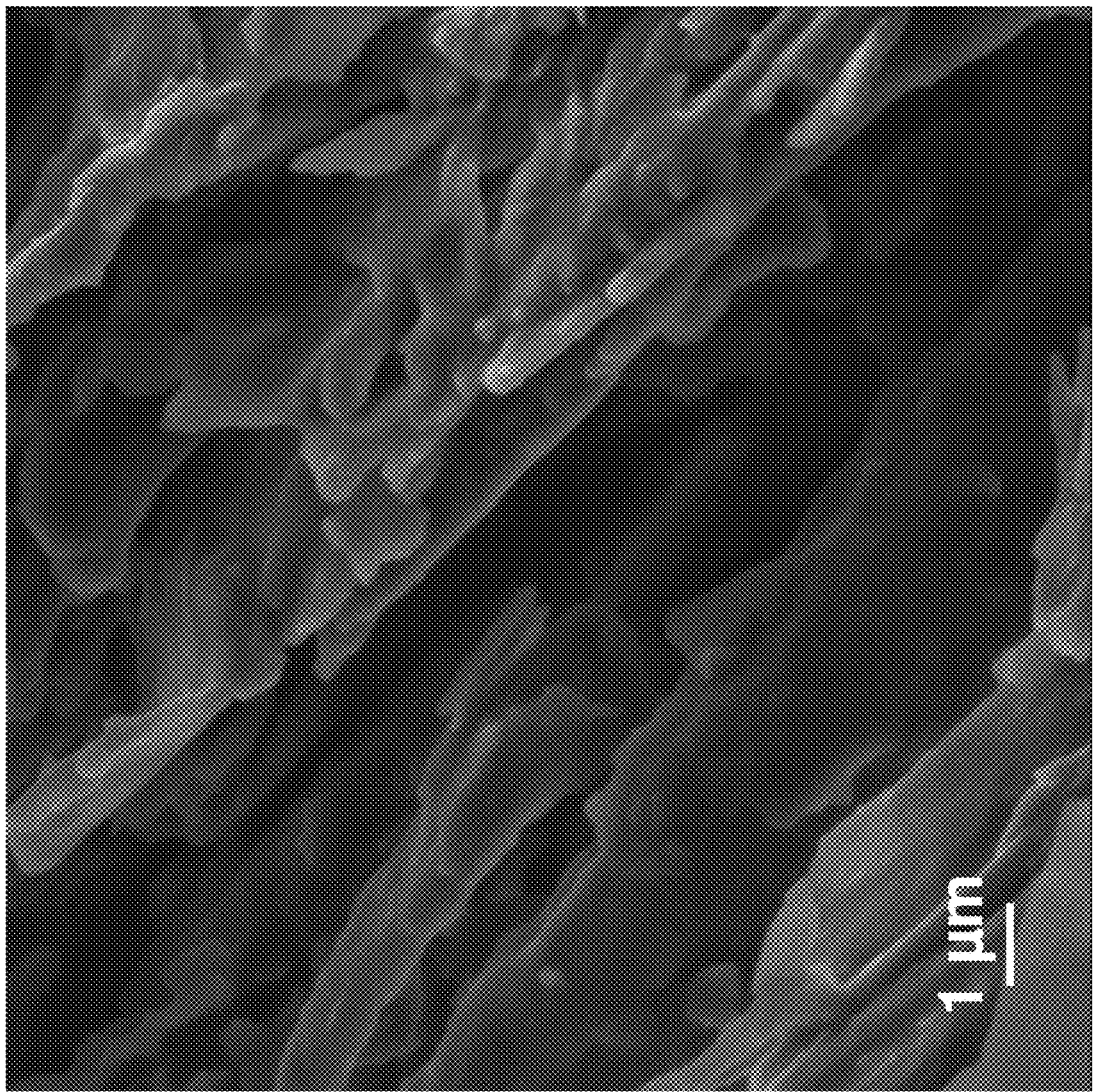
FIG. 5 is an example according to various embodiments, illustrating an SEM image of porous epoxy microstructures synthesized from 6~8 nm graphene particles.

First, to make a composite, 10 wt % Epon 828 (Hexion Inc.) epoxy resin, 10 wt % Versamid 125 (Gabriel Performance Products) curing agent, 4 wt % epoxidized soybean oil (from Arkema Inc.), 40 wt % canola oil and, 36 wt % graphene (6-8 nm, 10 µm flakes, Skyspring Nanomaterials) were placed in a mixing cup. Second, the ingredients are mixed using Flacktek Speedmixer at 3000 rpm for 2 min. The composite was cured at room temperature for 24 hours. After the composite was cured, the composite-template attachment was placed in acetone bath for 8 hours. Acetone drives out the porogen (canola oil) from the composite which resulted in a porous structure. Finally, the porous composite was dried in air. FIG. 5 is an example according to various embodiments, illustrating an SEM image of a porous epoxy microstructures synthesized from 10~20 nm fumed silica particles, which form large aggregates.

Example 6

A purpose of this example is to demonstrate results obtained from a parallel fabrication method according to various embodiments.

Figure 9:
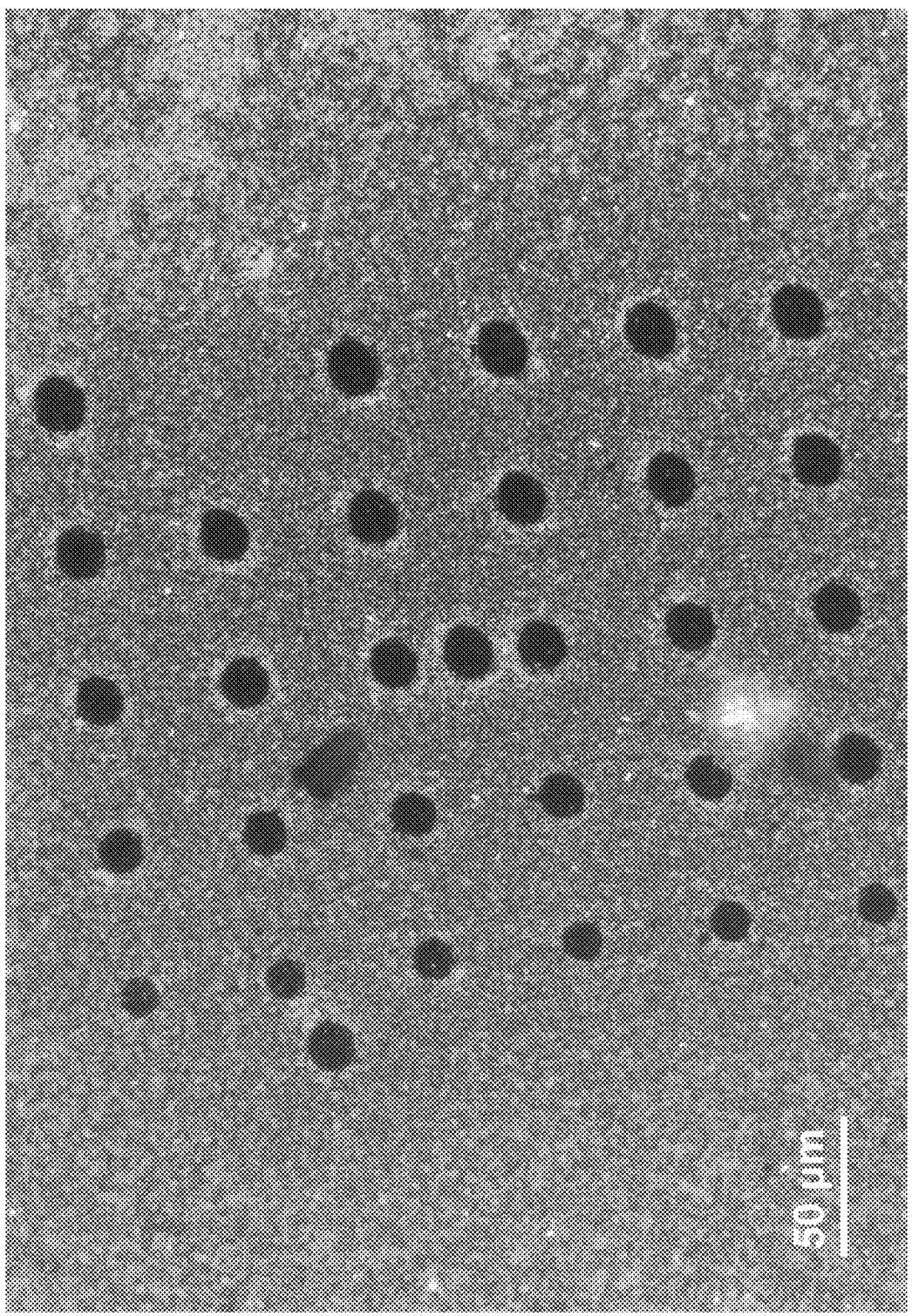
FIG. 9 is an example according to various embodiments, illustrating a porous material having a plurality of porous monoliths prepared via a parallel fabrication method.

First, a composite was mixed with the same composition as listed in Example 2. Afterward, the putty-like composite is molded against a template with an array of holes created using laser patterning of AZ-50XT (Integrated Micromaterials) photoresist. Upon curing, both the composite-template attachment is placed in acetone bath. Acetone dissolves the photoresist of template, resulting composite with micropillars. Acetone also drives out the porogen (canola oil) from the composite which results in porous structure. Finally, the porous composite is dried in air FIG. 9 is an example according to various embodiments, illustrating a porous material having a plurality of porous monoliths prepared via a parallel fabrication method.

Example 7

A purpose of this example is to demonstrate characteristics of a porous monolith formed according to various embodiments.

To make pillars, putty-like composite, prepared as discussed in the Example 2, is molded against a photoresist template with array of holes created using laser patterning of AZ-50XT (Integrated Micromaterials) photoresist. Upon curing, both the composite-template attachment is placed in acetone bath. Acetone dissolves the photoresist of template, resulting composite with micro-pillars. Acetone also drives out the porogen (canola oil) from the composite which results in porous structure. Afterward, the porous composite is dried in air. To compare the bulk porosity with the porosity of microstructures, a cross-section cut is carried out using focused ion beam (FIB) from the top of the pillar to a few microns underneath of its base.

Figure 10:
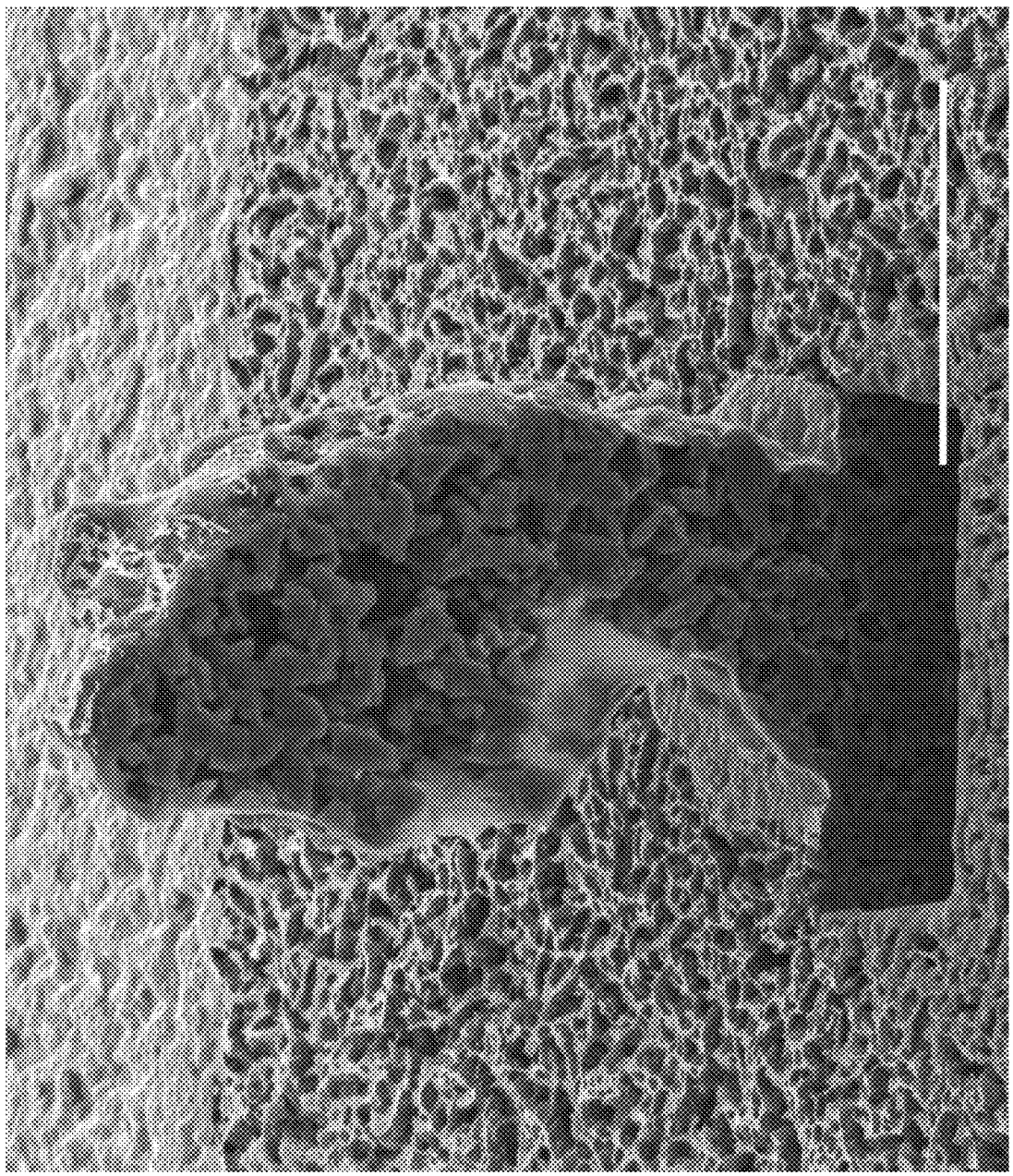
FIG. 10 is an example according to various embodiments, illustrating a focused ion beam (FIB) cross-sectional image of a porous monolith.

FIG. 10 is an example according to various embodiments, illustrating a focused ion beam (FIB) cross-sectional image of the porous monolith as imaged by a scanning electron microscope (SEM).

Example 8

A purpose of this example is to compare the curing temperature, curing time, porosity, and shrinkage characteristics of a porous material according to various embodiments with other materials.

First, the specific amount of two-part epoxy, particles, epoxidized oil, and canola oil are placed in a mixing cup. Second, the ingredients are mixed using speed-mixer at 3000 rpm. After the composite gets cured, to make it porous, the porogen (canola oil) is removed by submerging the monolith of the composite into acetone bath. Finally, the porous composite is dried in air.

The results are summarized in Table 1, with the last three entries listing properties of other common materials for comparison.

TABLE 1

| Material | Temperature | Time | Porosity | Shrinkage |
|---|---|---|---|---|
| porous material according to various embodiments | RT | 1 day | 30~60% | 1~5% |
| Epon 828 (Hexion) epoxy resin 7 wt %, Versamid 125 (Gabriel Performance Products) resin (crosslinking agent) 7 wt %, super activated carbon (<100 nm, Skyspring Nanomaterials) 40 wt %, epoxidized soybean oil (Arkema Inc.) 6 wt %, and canola oil 40 wt % | RT | 1 day | ~40% | 0.53% ± 0.09% |
| Epon 828 (Hexion) epoxy resin 8.89 wt %, Versamid 125 (Gabriel Performance Products) resin (crosslinking agent) 8.89 wt %, silica (60--70 nm, Skyspring Nanomaterials) 33.34 wt %, epoxidized soybean oil (Arkema Inc.) 4.44 wt %, and canola oil 44.44 wt % | RT | 1 day | ~60% | 2.50% ± 0.22% |
| Epon 828 (Hexion) epoxy resin 8.89 wt %, Versamid 125 (Gabriel Performance Products) resin (crosslinking agent) 8.89 wt %, silica (400 nm, Skyspring Nanomaterials) 33.34 wt %, epoxidized soybean oil (Arkema Inc.) 4.44 wt %, and canola oil 44.44 wt % | RT | 1 day | ~40% | 0.23% ± 0.14% |
| Epon 828 (Hexion) epoxy resin 8.89 wt %, Versamid 125 (Gabriel Performance Products) resin (crosslinking agent) 8.89 wt %, silica (1000 nm, Skyspring Nanomaterials) 33.34 wt %, epoxidized soybean oil (Arkema Inc.) 4.44 wt %, and canola oil 44.44 wt % | RT | 1 day | ~25% | 0.01% ± 0.08% |
| Epon 828 (Hexion) epoxy resin 7 wt %, Versamid 125 (Gabriel Performance Products) resin (crosslinking agent) 7 wt %, super activated carbon (<100 nm, Skyspring Nanomaterials) 38 wt %, carbon nanotubes (Nanocomp) 2 wt %, epoxidized soybean oil (Arkema Inc.) 6 wt %, and canola oil 40 wt % | RT | 1 day | ~40% | 2.91% ± 0.06% |
| Resorcinol-formaldehyde (from various literature) | 80° C. | 1 week (aqueous) | 80~90% | 2~8% |
| Epoxy/silicone (from various literature) | RT | 1 day | 0% | 2~7% |
| Sol gel (from various literature) (aqueous) | RT | 1 week | 70~99% | 60~85% |

As can be seen from Table 1, the porous material according to various embodiments can be cured quickly at room temperature and exhibits a good porosity and low shrinkage.

Example 9

Figure 11:
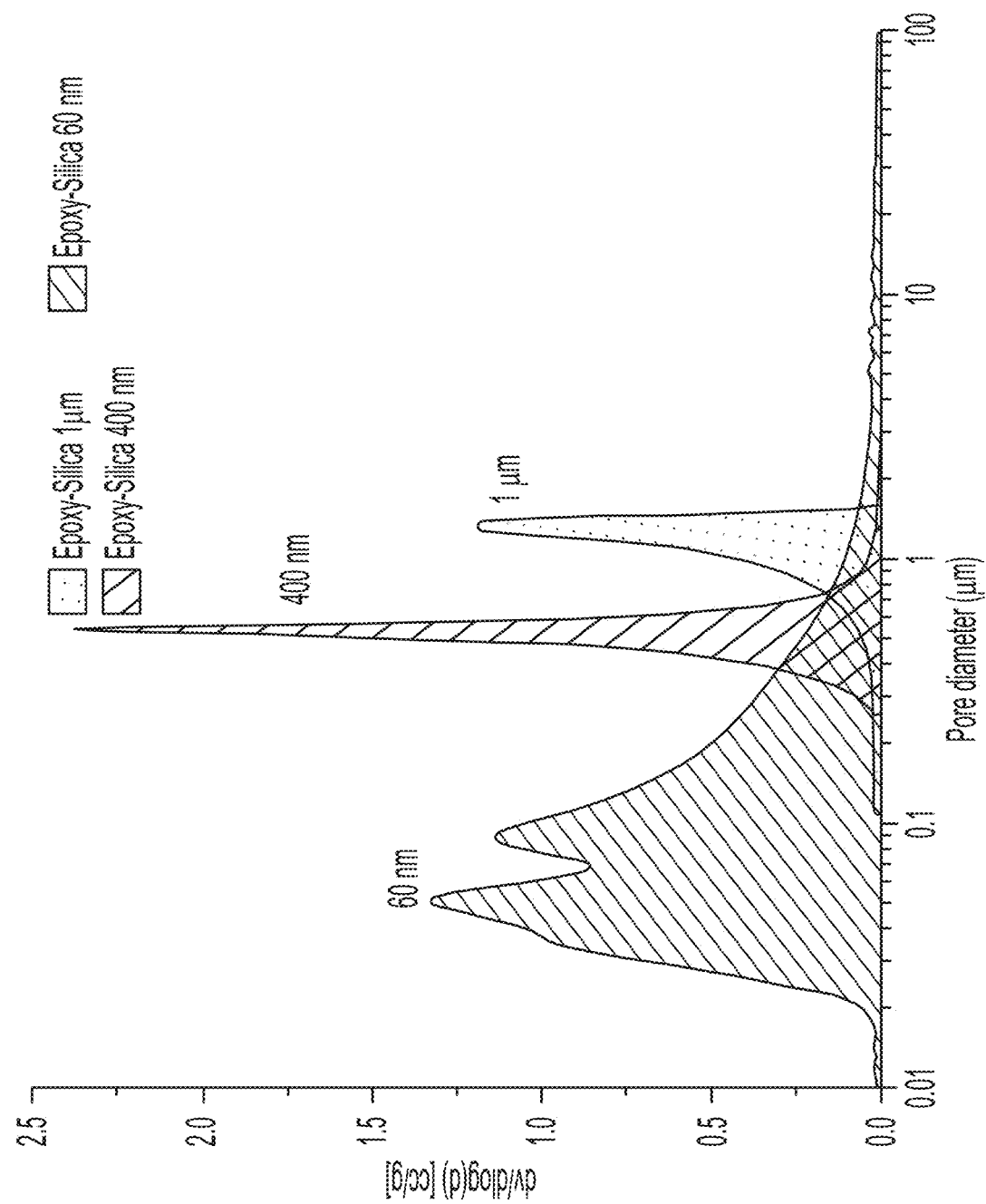
FIG. 11 is an example according to various embodiments, illustrating a relationship between pore volume and particle size along with SEM images for embodiments.

A purpose of this example is to demonstrate a methodology to obtain different pore volumes from the same particle material. FIG. 11 shows the pore volume of various embodiments made from differing particle sizes of silica as determined by mercury porosimetry.

The sample labeled "60 nm" was prepared as described in Example 4. The sample labeled "400 nm" was prepared as described in Example 3. The sample labeled "1 μm" was prepared as follows: The composite was made by speed mixing 8.89 wt % Epon 828 (Hexion Inc.) epoxy resin, 8.89 wt. % Versamid 125 (Gabriel Performance Products) curing agent, 4.44 wt % epoxidized soybean oil (from Arkema Inc.), 44.44 wt % canola oil, and 33.34 wt % silica (1 μm). The components were speed mixed for 1 minute in a Flacktek Speedmixer at 3500 RPM. After mixing, the composite was molded into thin bars and allowed to cure. Samples were soaked in acetone to remove the oil for 8 hours, followed by drying in air.

It can be seen that the particle size selection affects the pore size distribution.

Examples 10-12

A purpose of these examples is to demonstrate the ability to change materials properties through the use of different particles.

Example 9

To characterize mechanical properties, a porous composite was made as described in Example 3 using particles of different sizes and chemistries. Afterward, mechanical properties were measured in a dynamic mechanical analyzer (DMA).

The sample labeled "Silica (400 nm)" was made with the same procedure described in Example 3.

The sample labeled "Calcium carbonate (5000 nm)" was prepared as follows: A porous composite made using $CaCO_3$ particles. The composite was made by speed mixing 7 wt % Epon 828 (Hexion Inc.) epoxy resin, 7 wt % Versamid 125 (Gabriel Performance Products) curing agent, 2.8 wt % epoxidized soybean oil (from Arkema Inc.), 27.8 wt % canola oil, and 55.6 wt % calcium carbonate (5 microns, BeanTown Chemical). The components were speed mixed for 1 minute in a Flacktek Speedmixer at 3500 RPM. After mixing, the composite was molded into thin bars and allowed to cure. Samples were soaked in acetone to remove the oil for 4 hours, followed by drying in air.

The sample labeled "Silicone (1000 nm)" was prepared as follows: A porous composite made using $CaCO_3$ particles. The composite was made by speed mixing 8.8 wt % Epon 828 (Hexion Inc.) epoxy resin, 8.8 wt % Versamid 125 (Gabriel Performance Products) curing agent, 3.5 wt % epoxidized soybean oil (from Arkema Inc.), 35.1 wt % canola oil, and 43.9 wt % silicone particles (3 microns, Dowsil EP-5500, Dow Inc.). The components were speed mixed for 1 minute in a Flacktek Speedmixer at 3500 RPM. After mixing, the composite was molded into thin bars and allowed to cure. Samples were soaked in acetone to remove the oil for 4 hours, followed by drying in air.

Figure 12:
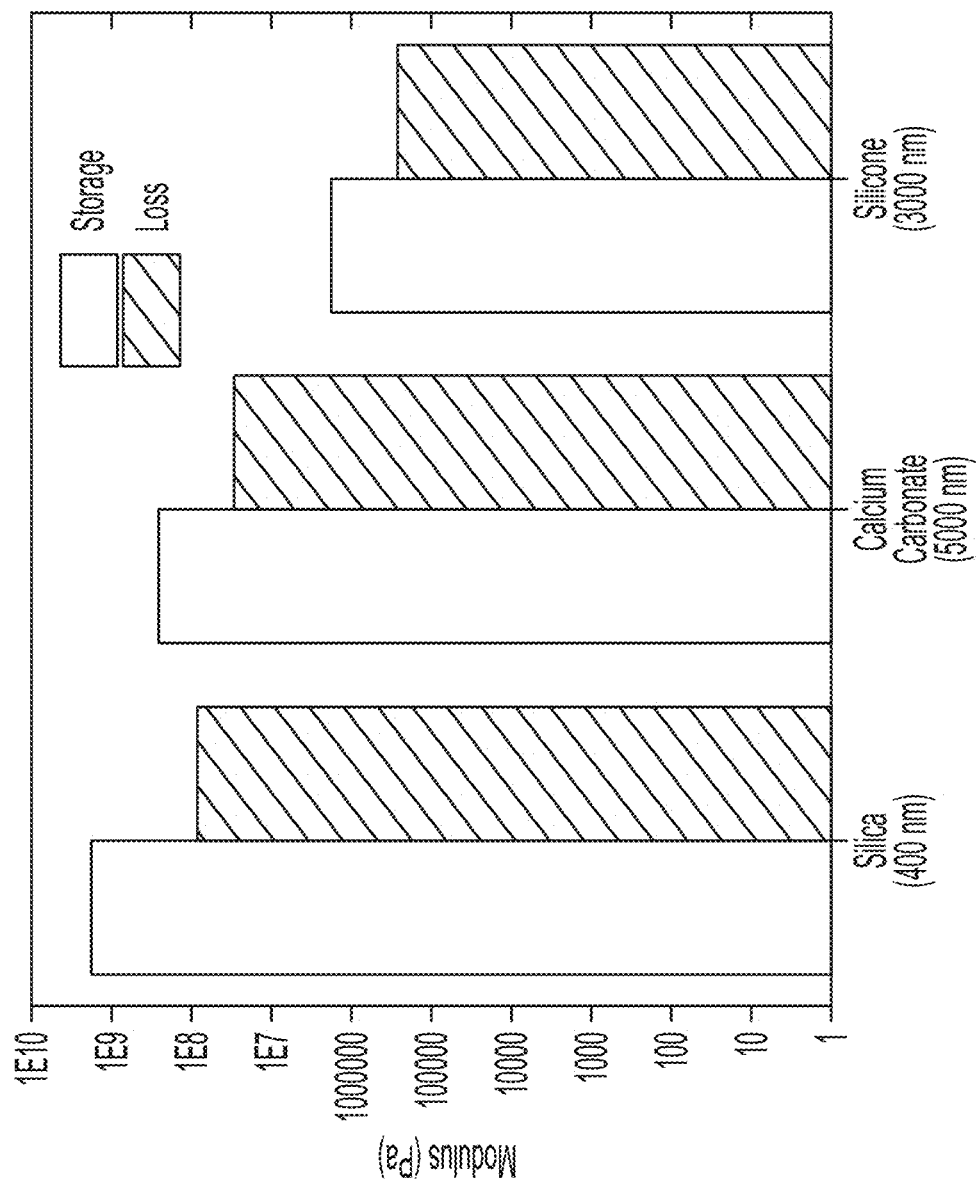
FIG. 12 is an example according to various embodiments, illustrating a relationship between mechanical properties and particle selection for various embodiments.

FIG. 12 shows the DMA results. It was seen that the storage (real part) and complex (imaginary part) of the mechanical properties could be changed over several orders of magnitude.

Example 10

To characterize electrical properties, a porous composite was made as described in Example 2 and Example 4 using particles of different sizes and chemistries, including blends with two particle types. The second set of particles were carbon nanotubes (CNT, Nanocomp), which were added to the particle mix at ~4 wt %. Afterward, electrical properties were measured with a two-point probe.

Table 2 shows the conductivity results. It was seen that the electrical resistivity could be changed over several orders of magnitude.

TABLE 2

| Particle | Resistivity (Ω-m) |
| --- | --- |
| Super activated carbon (SAC) | 325-440 |
| SAC+carbon nanotube (CNT) pulp | 0.4-0.8 |
| Graphene+CNT pulp | 0.05-0.15 |

Example 11

To characterize piezoelectric properties, porous composites were made from piezoelectric materials.

A porous composite made using $BaTiO_3$ particles. The composite was made by speed mixing 5.4 wt % Epon 828 (Hexion Inc.) epoxy resin, 5.4 wt % Versamid 125 (Gabriel Performance Products) curing agent, 2.2 wt % epoxidized soybean oil (from Arkema Inc.), 21.7 wt % canola oil and, 65.2 wt % $BaTiO_3$ (400 nm, Skyspring Nanomaterials). The components were speed mixed for 1 minute in a Flacktek Speedmixer at 3500 RPM. After mixing, the composite was molded into thin bars and allowed to cure. Samples were soaked in acetone to remove the oil for 4 hours, followed by drying in air.

A porous composite made using ZnO particles. The composite was made by speed mixing 5.4 wt % Epon 828 (Hexion Inc.) epoxy resin, 5.4 wt % Versamid 125 (Gabriel Performance Products) curing agent, 2.2 wt % epoxidized soybean oil (from Arkema Inc.), 21.7 wt % canola oil and, 65.2 wt % zinc oxide (Skyspring Nanomaterials). The components were speed mixed for 1 minute in a Flacktek Speedmixer at 3500 RPM. After mixing, the composite was molded into thin bars and allowed to cure. Samples were soaked in acetone to remove the oil for 4 hours, followed by drying in air.

It was found that the barium titanate composites had a permittivity of 4.8 F/m at 100 Hz and a d33 of 1.8 pC/N. Similarly, embodiments made of zinc oxide were found to have a permittivity of 0.115 F/m at 100 Hz and a d33 of 1.1 pC/N.

Example 12

A purpose of this example is to show the ability to perform post treatments to the porous monoliths. A porous composite was made using chitosan particles. The composite was made by combining 8.5 wt % Epon 828 (Hexion Inc.) epoxy resin, 8.5 wt. % Versamid 125 (Gabriel Performance Products) curing agent, 3.4 wt % epoxidized soybean oil (from Arkema Inc.), 33.9 wt % canola oil and 45.8 wt % chitosan powder. The components were speed mixed for 1 minute in a Flacktek Speedmixer at 3500 RPM. The composite was allowed to harden in the mixing cup without additional molding. Samples were then soaked in acetone to remove the oil for 4 hours, followed by drying in air. A layer of polydopamine was then deposited within the pores of some of the monoliths by submerging the samples for 2 minutes in a 2 mg/ml polydopamine solution buffered by 10 mM of tris(hydroxymethyl)aminomethane to a pH of 8.5. The dopamine solution containing the sample was then mixed with 0.33 M $Na_2HCO_3$ and 0.033M $CaCl_2$) in a 1:1:1 ratio in order to deposit $CaCO_3$ onto the chitosan surfaces. The solution was stirred for 24 hours. After rinsing and drying, these samples were observed by an x-ray diffractometer.

Figure 13:
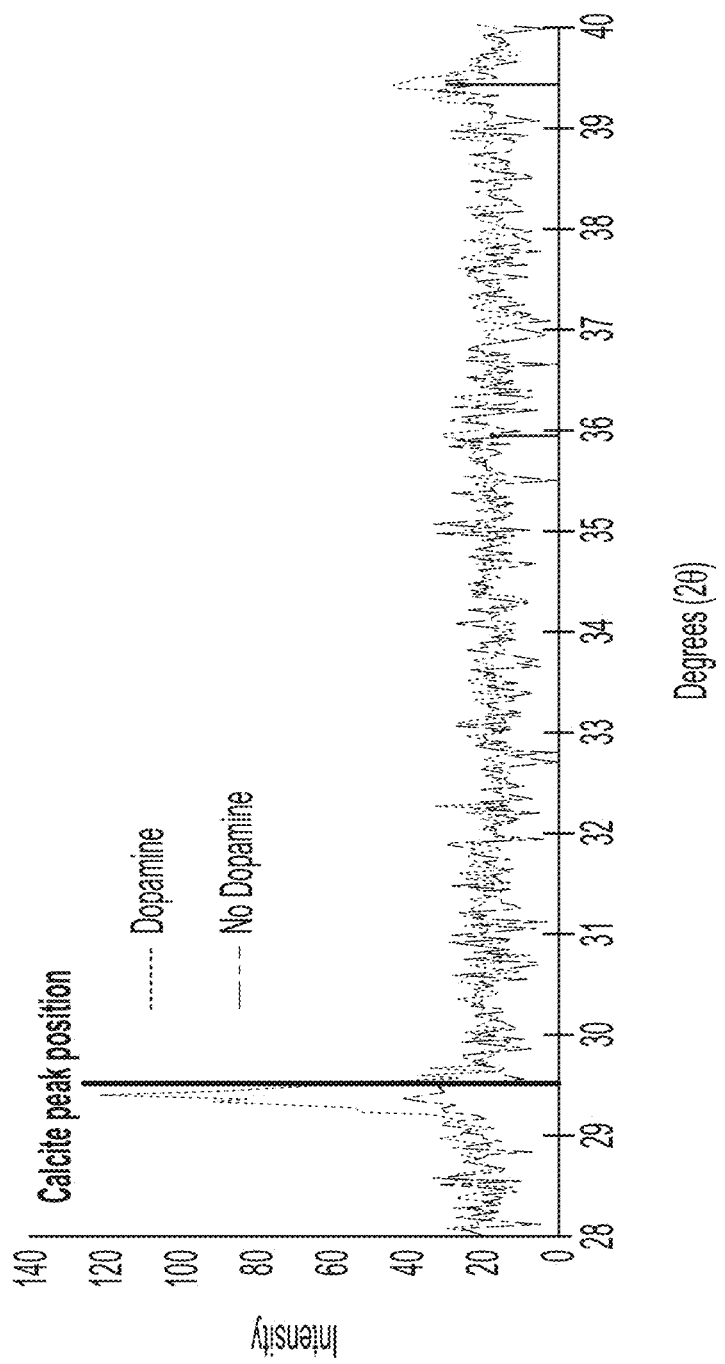
FIG. 13 is an example according to various embodiments, illustrating a post growth of calcite within various embodiments with and without dopamine present.

FIG. 13 shows via X-ray diffraction that biomineralization took place only in the presence of polydopamine through a reaction with chitosan. This illustrates that the porous monoliths can be treated afterwards to perform additional chemistry.

Example 13

Alternatively, a $CaCO_3$ porous composite was made using the procedure in Example 9. The composite material was then placed in a 1:1 wt. % chitosan-acetic acid aqueous solution with 0.1 wt % Triton x-100 used as a surfactant to reduce surface tension. After 24 hours, the composite samples were removed and dried allowing for the chitosan to deposit within the composite pores.

Figure 14:
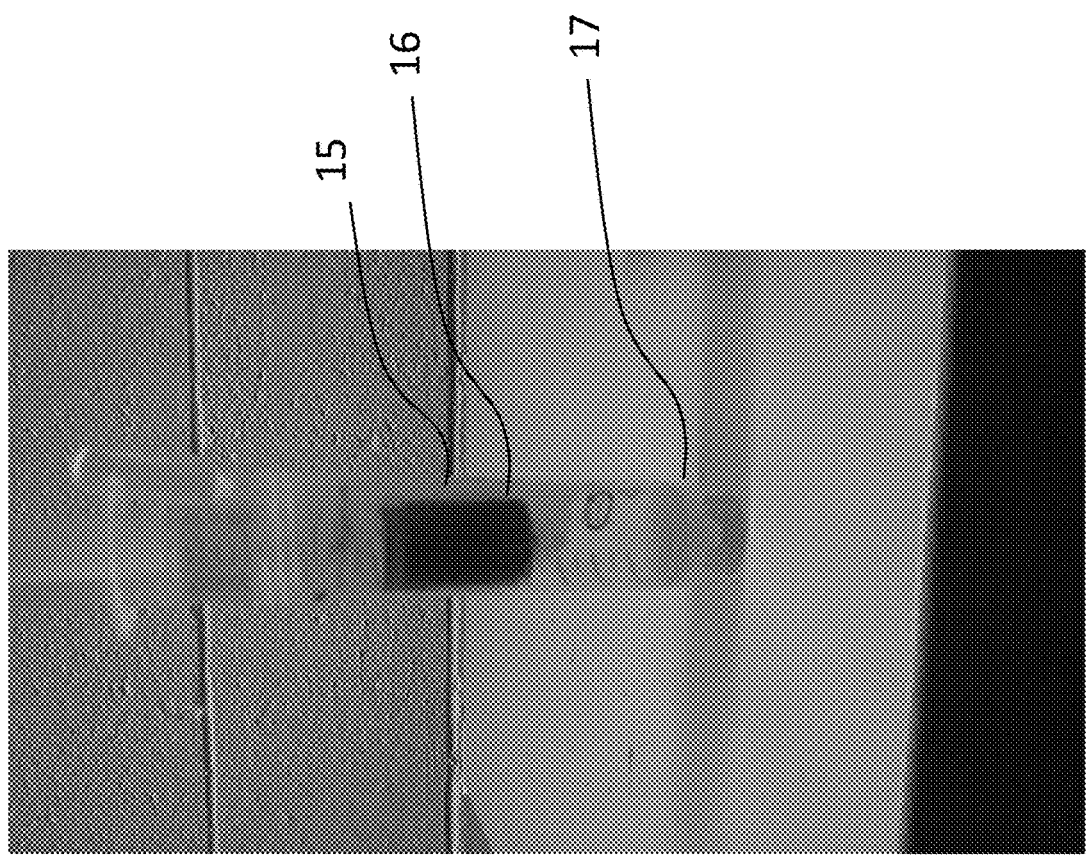
FIG. 14 is an example according to various embodiments, illustrating an on-demand gravity fed filtration application fabricated within a commercial syringe utilizing porous materials according to various embodiments.

FIG. 14 is an example according to various embodiments, illustrating an on-demand gravity fed filtration application fabricated within a commercial syringe of fluid 15 utilizing porous materials 16 according to various embodiments. The fluid 15 (which is subject to filtration) is a mixture of water, oil, surfactant, graphite flakes (1 μm), and rhodamine dye. The fluid 15 turns black in color due to graphite flakes. The graphite is being retained in the filter because the pores of the filter 16 are smaller than the sizes of graphite flakes, and as a result the filtered fluid 17 passes through the filter 16 is free from graphite. The rhodamine dye is responsible for pink color of the filtered fluid 17.

Example 14

A purpose of this example is to show the ability to cure multiple porous monoliths, having different properties, together into a single structure.

A first mixed composite was prepared as in Example 3. More specifically, to make a composite, 4.81 wt % Epon 828 (Hexion Inc.) epoxy resin, 4.81 wt. % Versamid 125 (Gabriel Performance Products) curing agent, 1.93 wt % epoxidized soybean oil (from Arkema Inc.), 21.15 wt % canola oil, and 67.30 wt % silica nanoparticles (400 nm) were placed in a mixing cup. Second, the ingredients are mixed using Flacktek Speedmixer at 3000 rpm for 1 min. Third, the mixed composite had putty-like viscosity which was pressed against a skeleton hand mold/template.

A second mixed composite was prepared as in Example 4. More specifically, to make a composite, 8.89 wt % Epon 828 (Hexion Inc.) epoxy resin, 8.89 wt. % Versamid 125 (Gabriel Performance Products) curing agent, 4.44 wt % epoxidized soybean oil (from Arkema Inc.), 44.44 wt % canola oil, and 33.34 wt % silica nanoparticles (60 nm, Skyspring Nanomaterials) were placed in a mixing cup. Second, the ingredients are mixed using Flacktek Speedmixer at 3000 rpm for 1 min.

Figure 15:
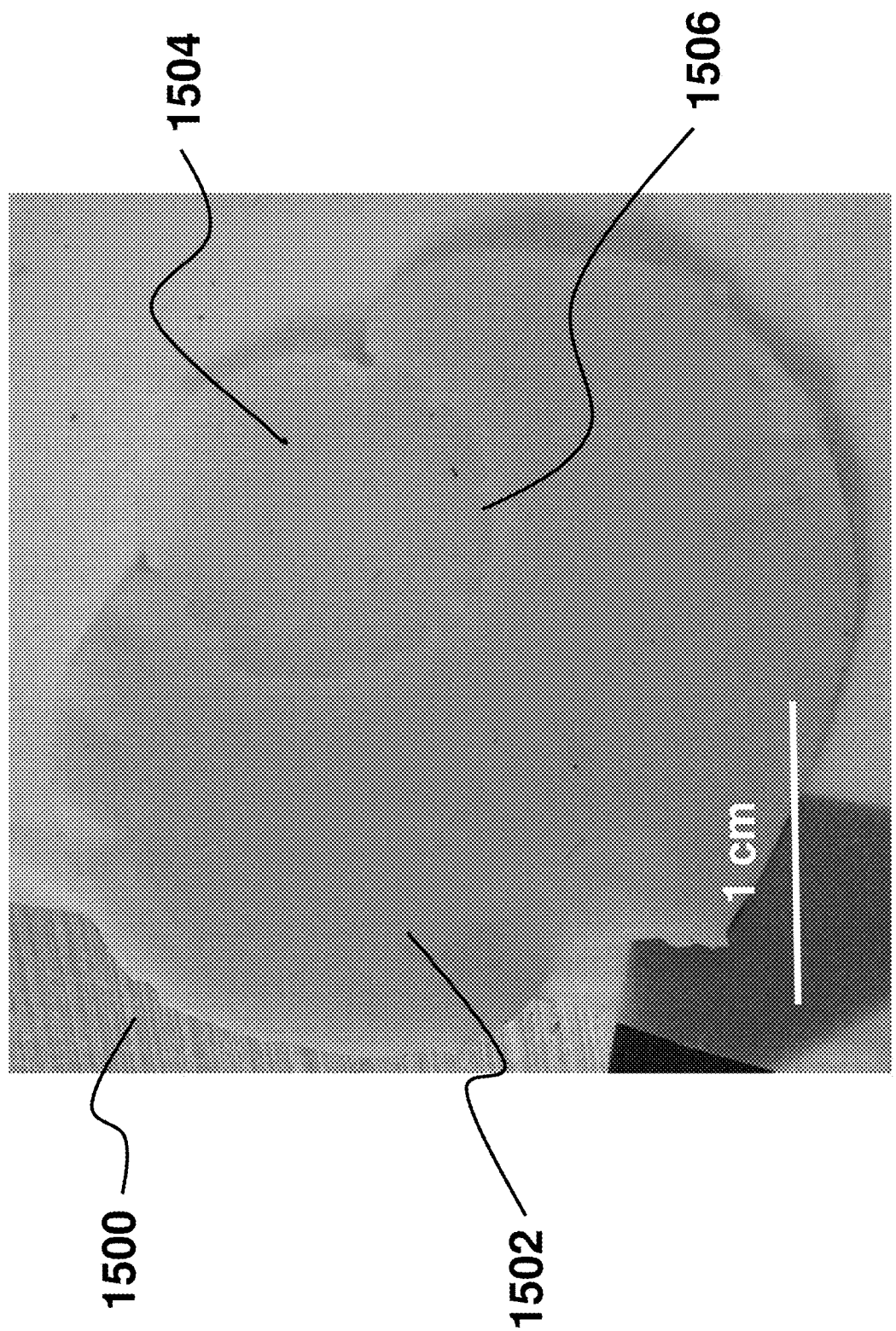
FIG. 15 is an example according to various embodiments illustrating two monoliths cured together into a single structure.

The first and second mixed composites were both putty-like formulations. They were placed between two Teflon sheets in contact and cured at room temperature for 24 hours such that a complete interface was formed between the materials before immersion in acetone for 8 hr and drying in air. FIG. 15 is an example according to various embodiments illustrating two monoliths cured together into a single structure. More specifically, FIG. 15 shows the two monolith formulations cured together to form a fully-connected interface.

Referring to FIG. 15, the overall structure 1500 included a first monolith 1502 and a second monolith 1504 that were connected via an interface 1506. The first monolith 1502 corresponds to the first mixture with 400 nm silica nanoparticles. The second monolith 1504 corresponds to the second mixture with 60 nm silica nanoparticles.

This example demonstrates that multiple porous monoliths may be cured together to provide abrupt changes in porosity within the same monolith, this is something that would be difficult to do via any other means.

REFERENCES

The following are hereby incorporated by reference as if fully set forth herein, except for terminology inconsistent with that used herein.
1. Berkowitz, B., Characterizing flow and transport in fractured geological media: A review. Advances in Water Resources 2002, 25 (8), 861-884.
2. MacDonald, T. R.; Kitanidis, P. K.; McCarty, P. L.; Roberts, P. V., Effects of Shear Detachment on Biomass Growth and In Situ Bioremediation. Ground Water 1999, 37 (4), 555-563.
3. Robert, H. W., Confocal optical microscopy. Reports on Progress in Physics 1996, 59 (3), 427.
4. Prasad, V.; Semwogerere, D.; Eric, R. W., Confocal microscopy of colloids. Journal of Physics: Condensed Matter 2007, 19 (11), 113102.
5. Dittrich, P. S.; Manz, A., Lab-on-a-chip: microfluidics in drug discovery. Nature Reviews Drug Discovery 2006, 5, 210.
6. Knob, R.; Sahore, V.; Sonker, M.; Woolley, A. T., Advances in monoliths and related porous materials for microfluidics. Biomicrofluidics 2016, 10 (3), 19.
7. Jeon, S.; Park, J.-U.; Cirelli, R.; Yang, S.; Heitzman, C. E.; Braun, P. V.; Kenis, P. J. A.; Rogers, J. A., Fabricating complex three-dimensional nanostructures with high-resolution conformable phase masks. Proceedings of the National Academy of Sciences of the U.S. Pat. No. 2,004,101 (34), 12428-12433.
8. Gorey, B.; Galineau, J.; White, B.; Smyth, M. R.; Morrin, A., Inverse-Opal Conducting Polymer Monoliths in Microfluidic Channels. Electroanalysis 2012, 24 (6),
9. Araya-Farias, M.; Taverna, M.; Woytasik, M.; Bayle, F.; Guerrouache, M.; Ayed, I.; Cao, H. H.; Carbonnier, B.; Tran, N. T., A new strategy for simultaneous synthesis and efficient anchorage of polymer monoliths in native PDMS microchips. Polymer 2015, 66, 249-258.
10. Kendall, E. L.; Wienhold, E.; Rahmanian, O. D.; DeVoe, D. L., Ex situ integration of multifunctional porous polymer monoliths into thermoplastic microfluidic chips. Sensors and Actuators B: Chemical 2014, 202, 866-872.
11. Sawyer, P. S.; Lenhart, J. L.; Lee, E.; Kallam, A.; Majumdar, P.; Dirk, S. M.; Gubbins, N.; Chisholm, B. J.; Celina, M. C.; Bahr, J. Control of pore size in epoxy systems; Sandia National Laboratories: 2009.
12. Kato, M.; Sakai-Kato, K.; Toyo'oka, T.; Dulay, M. T.; Quirino, J. P.; Bennett, B. D.; Zare, R. N., Effect of preparatory conditions on the performance of photopolymerized sol-gel monoliths for capillary electrochromatography. Journal of Chromatography A 2002, 961 (1), 45-51.
13. Levy, M. H.; Goswami, S.; Plawsky, J.; Cramer, S. M., Parameters Governing the Formation of Photopolymerized Silica Sol-Gel Monoliths in PDMS Microfluidic Chips. Chromatographia 2013, 76 (15), 993-1002.
14. Hillmyer, M. A., Nanoporous Materials from Block Copolymer Precursors. In Block Copolymers II, Abetz, V., Ed. Springer Berlin Heidelberg: Berlin, Heidelberg, 2005; pp 137-181.
15. Feng, P.; Bu, X.; Stucky, G. D.; Pine, D. J., Monolithic Mesoporous Silica Templated by Microemulsion Liquid Crystals. Journal of the American Chemical Society 2000, 122 (5), 994-995.

16. Cates, M. E.; Clegg, P. S., Bijels: a new class of soft materials. Soft Matter 2008, 4 (11), 2132-2138.
17. Cai, D.; Clegg, P. S.; Li, T.; Rumble, K. A.; Tavacoli, J. W., Bijels formed by direct mixing. Soft Matter 2017, 13 (28), 4824-4829.
18. Neirinck, B.; Van Deursen, J.; Van der Biest, O.; Vleugels, J., Wettability Assessment of Submicrometer Alumina Powder Using a Modified Washburn Method. Journal of the American Ceramic Society 2010, 93 (9), 2515-2518.
19. Siebold, A.; Walliser, A.; Nardin, M.; Oppliger, M.; Schultz, J., Capillary Rise for Thermodynamic Characterization of Solid Particle Surface. Journal of Colloid and Interface Science 1997, 186 (1), 60-70.
20. Fan, J.; Li, Y.; Bisoyi, H. K.; Zola, R. S.; Yang, D.-k.; Bunning, T. J.; Weitz, D. A.; Li, Q., Light-Directing Omnidirectional Circularly Polarized Reflection from Liquid-Crystal Droplets. Angewandte Chemie International Edition 2015, 54 (7), 2160-2164.
21. Anbari, A.; Chien, H. T.; Datta, S. S.; Deng, W.; Weitz, D. A.; Fan, J., Microfluidic Model Porous Media: Fabrication and Applications. Small 2018, 1703575-n/a.
22. Nge, P. N.; Rogers, C. I.; Woolley, A. T., Advances in Microfluidic Materials, Functions, Integration, and Applications. Chemical Reviews 2013, 113 (4), 2550-2583.
23. Zamani, A.; Maini, B., Flow of dispersed particles through porous media—deep bed filtration. Journal of Petroleum Science and Engineering 2009, 69 (1-2), 71-88.
24. Gibson, M. A. et al. 3D printing metals like thermoplastics: Fused filament fabrication of metallic glasses, Materials Today, 2018, 21, 7
25. https://www.microcontrollertips.com/challenges-in-designing-electronics-for-satellites/

What is claimed is:

1. A method of preparing a porous material, the method comprising:
preparing a mixture, the mixture comprising:
from about 10 to about 30% by mass of a matrix material,
from about 20 to about 60% by mass of a plurality of particles,
from about 20 to about 60% by mass of a porogen, and
from about 1 to about 10% by mass of an interfacial compatibilizer;
mixing the mixture to trigger a phase separation of the mixture into a bicontinuous emulsion, wherein the bicontinuous emulsion is in the form of a paste having a viscosity that does not allow for macrophase separation during curing;
wherein the matrix material and the porogen are phase separated in the bicontinuous emulsion;
wherein the interfacial compatibilizer has a tendency to segregate to an interface between the porogen and the matrix material in the bicontinuous emulsion;
wherein the plurality of particles have a tendency to segregate to the matrix material or the interface between the porogen and the matrix material in the bicontinuous emulsion;
placing the bicontinuous emulsion into a form;
initiating a solidification of the matrix material during which the porogen remains nonvolatile and the matrix material and the porogen remain phase separated and bicontinuous; and
obtaining the porous material.

2. The method according to claim 1, wherein the matrix material is selected from the group consisting of a polymer, an oligomer, and combinations thereof.

3. The method according to claim 1, wherein the matrix material is an epoxy.

4. The method according to claim 1, wherein the matrix material is a multi-part epoxy.

5. The method according to claim 1, wherein the matrix material is a photo crosslinkable resin.

6. The method according to claim 1, wherein the matrix material is a thermally crosslinkable resin.

7. The method according to claim 1, wherein the plurality of particles comprise at least one selected from the group consisting of activated carbon, silica, fumed silica, epoxidized silica, alumina, carbon nanotubes, graphite, graphene, titania, latex, silica aerogel, silica xerogel, carbon foam, silicone rubber, butadiene rubber, aluminum, gold, silver, cadmium selenide, boron nitride, and combinations thereof.

8. The method according to claim 1, wherein the particles have an activity selected from the group consisting of an antimicrobial activity, a catalytic activity, a plasmonic activity, a photoabsorbing activity, piezoelectric activity, and combinations thereof.

9. The method according to claim 1, wherein the porogen is an oil.

10. The method according to claim 1, wherein the interfacial compatibilizer comprises an epoxidized oil.

11. The method according to claim 1, wherein preparing the mixture is done at room temperature.

12. The method according to claim 1, wherein initiating the solidification comprises initiating a crosslinking reaction of the matrix material by adding a crosslinker to the mixture.

13. The method according to claim 1, further comprising:
preparing a second mixture, wherein the second mixture is different than the first mixture, the second mixture comprising:
from about 10 to about 30% by mass of a second matrix material,
from about 20 to about 60% by mass of a second plurality of particles,
from about 20 to about 60% by mass of a second porogen, and
from about 1 to about 10% by mass of a second interfacial compatibilizer,
mixing the second mixture to trigger a phase separation of the second mixture into a bicontinuous emulsion, wherein the bicontinuous emulsion is in the form of a paste having a viscosity that does not allow for macrophase separation during curing;
wherein the second matrix material and the second porogen are phase separated in the bicontinuous emulsion;
wherein the second interfacial compatibilizer has a tendency to segregate to an interface between the second porogen and the second matrix material in the bicontinuous emulsion;
wherein the second plurality of particles have a tendency to segregate to the second matrix material or the interface between the second porogen and the second matrix material in the bicontinuous emulsion;
placing the bicontinuous emulsion into the form adjacent to the first mixture;
initiating a solidification of the second matrix material during which the second porogen remains nonvolatile and the second matrix material and the second porogen remain phase separated and bicontinuous; and
obtaining the porous material.

14. The method according to claim 1, further comprising removing at least a portion of the porogen to obtain the porous material with open porosity.

15. The method according to claim 1, wherein the mixing step is performed along two axes to create the bicontinuous emulsion, wherein the bicontinuous emulsion is an air-free homogenized mixture and in the form of the paste having the viscosity that prevents macrophase separation during curing.

16. The method according to claim 1, the viscosity of the paste has a value where viscous forces are much greater in magnitude than capillary forces.

17. The method according to claim 16, wherein the value of the viscosity is in a range from about $1\times10^4$ Pa·s to about $1\times10^6$ Pa·s.

\* \* \* \* \*